United States Patent
Lee

(10) Patent No.: US 10,498,163 B2
(45) Date of Patent: Dec. 3, 2019

(54) MULTI-COIL WIRELESS CHARGING METHOD AND DEVICE AND SYSTEM THEREFOR

(71) Applicant: LG INNOTEK CO., LTD., Seoul (KR)

(72) Inventor: Yun Bok Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 91 days.

(21) Appl. No.: 15/773,646

(22) PCT Filed: Aug. 23, 2016

(86) PCT No.: PCT/KR2016/009282
§ 371 (c)(1),
(2) Date: May 4, 2018

(87) PCT Pub. No.: WO2017/078256
PCT Pub. Date: May 11, 2017

(65) Prior Publication Data
US 2018/0323634 A1    Nov. 8, 2018

(30) Foreign Application Priority Data
Nov. 6, 2015    (KR) ........................ 10-2015-0155463

(51) Int. Cl.
*H02J 7/00*    (2006.01)
*H02J 7/02*    (2016.01)
(Continued)

(52) U.S. Cl.
CPC .............. *H02J 7/025* (2013.01); *H01F 27/29* (2013.01); *H02J 50/12* (2016.02)

(58) Field of Classification Search
USPC ........................................................ 320/108
See application file for complete search history.

(56) References Cited

U.S. PATENT DOCUMENTS

2009/0230777 A1    9/2009  Baarman et al.
2011/0025133 A1    2/2011  Sauerlaender et al.
(Continued)

FOREIGN PATENT DOCUMENTS

JP    2011-517265 A    5/2011
JP    2015-029415 A    2/2015
(Continued)

OTHER PUBLICATIONS

International Search Report for PCT/KR2016/009282 (PCT/ISA/210) dated Nov. 21, 2016.

*Primary Examiner* — Samuel Berhanu
(74) *Attorney, Agent, or Firm* — Birch, Stewart, Kolasch & Birch, LLP

(57) ABSTRACT

The present invention relates to a multi-coil wireless charging method and a device and a system therefor, a wireless power transmitter for wirelessly transmitting power to a wireless power receiver, according to one embodiment of the present invention, comprising: a power transmission unit which comprises at least two or more transmission coils; a control unit which controls so that a primary detection signal for detecting the existence of a wireless power receiver is simultaneously transmitted by using frequencies that are different from each other that were allocated to each of the transmission coils in advance; and a demodulation unit which, if a first signal strength indicator associated with the primary detection signal is received from the wireless power receiver, transmits, to the control unit, the received first signal strength indicator and a preset transmission coil identifier for identifying the transmission coil through which the first signal strength indicator was received, wherein the control unit may control so that a secondary detection signal is transmitted through the transmission coil through which the first signal strength indicator was received. Thus, the (Continued)

present invention has a merit of enabling a quicker and more accurate detection of a wireless power receiver.

19 Claims, 15 Drawing Sheets

(51) Int. Cl.
*H02J 50/12* (2016.01)
*H01F 27/29* (2006.01)

(56) References Cited

U.S. PATENT DOCUMENTS

| | | | |
|---|---|---|---|
| 2011/0275361 A1* | 11/2011 | Yavuz | H04W 52/143 455/422.1 |
| 2013/0141037 A1 | 6/2013 | Jenwatanavet et al. | |
| 2014/0375258 A1 | 12/2014 | Arkhipenkov et al. | |
| 2016/0013685 A1* | 1/2016 | Zeine | H02J 50/40 320/108 |
| 2016/0099578 A1* | 4/2016 | Hwang | H02J 50/40 307/104 |
| 2016/0164335 A1* | 6/2016 | Kanahara | H02J 7/0044 320/108 |

FOREIGN PATENT DOCUMENTS

| | | |
|---|---|---|
| KR | 10-2005-0122669 A | 12/2005 |
| KR | 10-2014-0098239 A | 8/2014 |
| KR | 10-2014-0147650 A | 12/2014 |

\* cited by examiner

MULTI-COIL WIRELESS CHARGING METHOD AND DEVICE AND SYSTEM THEREFOR

CROSS REFERENCE TO RELATED APPLICATIONS

This application is the National Phase of PCT International Application No. PCT/KR2016/009282, filed on Aug. 23, 2016, which claims priority under 35 U.S.C. 119(a) to Patent Application No. 10-2015-0155463, filed in the Republic of Korea on Nov. 6, 2015, all of which are hereby expressly incorporated by reference into the present application.

TECHNICAL FIELD

Embodiments relate to a wireless power transmission technique, and more particularly, to a multi-coil wireless charging method for minimizing a time required for a wireless power transmitter equipped with a plurality of transmission coils to recognize a wireless power receiver, and a device and system therefor.

BACKGROUND ART

Recently, as information and communication technology rapidly develops, a ubiquitous society based on information and communication technology is being formed.

To allow information communication devices to be connected anytime and anywhere, sensors equipped with a computer chip having a communication function should be installed in all facilities. Therefore, supply of power to these devices or sensors is a new challenge. In addition, as the kinds of portable devices such as Bluetooth handsets and music players like iPods, as well as mobile phones, rapidly increase in number, charging batteries thereof has required time and effort. As a way to address this issue, wireless power transmission technology has recently drawn attention.

Wireless power transmission (or wireless energy transfer) is a technology for wirelessly transmitting electric energy from a transmitter to a receiver based on the induction principle of a magnetic field. Back in the 1800s, electric motors or transformers based on electromagnetic induction began to be used. Thereafter, a method of transmitting electric energy by radiating a high frequency wave or an electromagnetic wave, such as a microwave or laser, was tried. Electric toothbrushes and some common wireless shavers are charged through electromagnetic induction.

Wireless energy transmission techniques introduced up to now may be broadly divided into magnetic induction, electromagnetic resonance, and RF transmission employing a short wavelength radio frequency.

In the magnetic induction scheme, when two coils are arranged adjacent each other and current is applied to one of the coils, a magnetic flux generated at this time generates electromotive force in the other coil. This technology is being rapidly commercialized mainly for small devices such as mobile phones. In the electromagnetic induction scheme, power of up to several hundred kilowatts (kW) may be transmitted with high efficiency, but the maximum transmission distance is less than or equal to 1 cm. As a result, devices are generally required to be placed adjacent to a charger or a pad, which is disadvantageous.

The magnetic resonance scheme uses an electric field or a magnetic field instead of employing an electromagnetic wave or current. The magnetic resonance scheme is advantageous in that the scheme is safe for other electronic devices or the human body since it is hardly influenced by the electromagnetic waves. However, the distance and space available for this scheme are limited, and the energy transfer efficiency of the scheme is rather low.

The short-wavelength wireless power transmission scheme (simply, RF transmission scheme) takes advantage of the fact that energy can be transmitted and received directly in the form of radio waves. This technique is an RF-based wireless power transmission scheme using a rectenna. A rectenna, which is a compound word of antenna and rectifier, refers to a device that converts RF power directly into direct current (DC) power. That is, the RF scheme is a technique of converting AC radio waves into DC waves. Recently, with improvement in efficiency, commercialization of RF technology has been actively researched.

The wireless power transmission technique is employable in various industries including IT, railroads, and home appliances as well as the mobile industry.

Recently, wireless power transmitters equipped with a plurality of coils have been introduced to increase the recognition rate of a wireless power receiver placed on a charging bed. However, the conventional wireless power transmitter equipped with a plurality of coils sequentially transmits detection signals, including, for example, a ping signal used for the electromagnetic induction scheme and a beacon signal used for the electromagnetic resonance scheme.

In particular, the conventional wireless power transmitter equipped with a plurality of conventional transmission coils is controlled to repeatedly transmit a detection signal sequentially through the respective transmission coils a predetermined number of times, for example, twice, to reduce recognition errors for the wireless power receiver and to determine transmission coils exhibiting good charging efficiency.

However, in the method of repeatedly transmitting the detection signal sequentially a predetermined number of times through each of the transmission coils, a transmission coil to be used for the wireless power receiver is identified only after a preset detection signal transmission procedure is completed. Therefore, it takes a lot of time to recognize the wireless power receiver. Moreover, the power of the capacitor of the charged wireless power receiver is discharged through the detection signal, and thus the wireless power receiver fails to transmit a predetermined response signal including a signal strength indicator to the wireless power transmitter. As a result, the receiver fails to be recognized.

DISCLOSURE

Technical Problem

Therefore, the present disclosure has been made in view of the above problems, and embodiments provide a multi-coil wireless charging method and a device and system therefor.

Embodiments provide a multi-coil wireless charging method capable of increasing the recognition rate of a wireless power receiver and minimizing the time required for recognition, and a device and system therefor.

Embodiments provide a multi-coil wireless charging method capable of minimizing a recognition time for a wireless power receiver by controlling a wireless power transmitter provided with a plurality transmission coils to simultaneously transmit detection signals through the transmission coils using different frequencies, and a device and system therefor.

Embodiments provide a multi-coil wireless charging method capable of minimizing a recognition time for a wireless power receiver by controlling a wireless power transmitter provided with a plurality transmission coils to encode detection signals for the respective transmission coils using different codes and simultaneously transmit the same through the transmission coils, and a device and system therefor.

The technical objects that can be achieved through the embodiments are not limited to what has been particularly described hereinabove and other technical objects not described herein will be more clearly understood by persons skilled in the art from the following detailed description.

Technical Solution

The present disclosure may provide a multi-coil wireless charging method, and a device and system therefor.

In one embodiment, a wireless power transmitter for wirelessly transmitting power to a wireless power receiver may include a power transmission unit including at least two transmission coils, a controller configured to control a first detection signal for detecting presence of the wireless power receiver so as to be transmitted simultaneously using different frequencies pre-allocated to each of the transmission coils, and a demodulation unit configured to transmit, when a first signal strength indicator corresponding to the first detection signal is received from the wireless power receiver, the received first signal strength indicator and a predetermined transmission coil identifier for identifying a transmission coil through which the first signal strength indicator has been received to the controller, wherein the controller may control a second detection signal so as to be transmitted through the transmission coil through which the first signal strength indicator has been received.

In addition, the controller may control the power so as to be transmitted to the wireless power receiver using a frequency corresponding to a transmission coil through which a second signal strength indicator corresponding to the second detection signal has been received.

In addition, when the second signal strength indicator has been received through a plurality of transmission coils, the controller may select a frequency to be used for power transmission to the wireless power receiver, based on the second signal strength indicator.

Here, the second signal strength indicator may be intensity information about output power of a rectifier mounted on the wireless power receiver.

The wireless power transmitter may further include a power conversion unit configured to convert power applied from a power source and transmit the converted power to the power transmission unit, wherein the power conversion unit may include at least one of a DC/DC converter configured to convert DC power applied from the power source into DC power of a predetermined intensity, a power sensor configured to measure the intensity of the converted DC power obtained by the DC/DC converter, or an amplifier configured to amplify the converted DC power.

The wireless power transmitter may further include a frequency generator configured to generate a predetermined frequency signal to insert an AC component into the converted DC power.

The wireless power transmitter may further include a switch configured to control the power converted by the power conversion unit so as to be transmitted through one of the at least two transmission coils.

The wireless power transmitter may further include a detection signal transmission timer configured to control a time to transmit the detection signals through the transmission coils, wherein, when the transmission time of the detection signals arrives, the controller may control the switch to transmit the first detection signal or the second detection signal.

In addition, the first detection signal and second detection signal may be digital ping signals defined in a WPC standard or a PMA standard.

In another embodiment, a wireless power transmitter for wirelessly transmitting power to a wireless power receiver may include a power transmission unit including at least two transmission coils, a controller configured to control a first detection signal for detecting presence of the wireless power receiver so as to be encoded with codes allocated to the respective transmission coils and transmitted simultaneously, and a demodulation unit configured to transmit, when a first signal strength indicator corresponding to the first detection signal is received from the wireless power receiver, the received first signal strength indicator and a predetermined transmission coil identifier for identifying a transmission coil through which the first signal strength indicator has been received to the controller, wherein the controller may control a second detection signal so as to be transmitted through the transmission coil through which the first signal strength indicator has been received.

In addition, the controller may control the power so as to be transmitted to the wireless power receiver using a code corresponding to a transmission coil through which a second signal strength indicator corresponding to the second detection signal has been received.

In addition, when the second signal strength indicator has been received through a plurality of transmission coils, the controller may select a code to be used for power transmission to the wireless power receiver, based on the second signal strength indicator.

In addition, the second signal strength indicator may be intensity information about output power of a rectifier mounted on the wireless power receiver.

The wireless power transmitter may further include a power conversion unit configured to convert power applied from a power source and transmit the converted power to the power transmission unit, wherein the power conversion unit may include at least one of a DC/DC converter configured to convert DC power applied from the power source into DC power of a predetermined intensity, a power sensor configured to measure the intensity of the converted DC power obtained by the DC/DC converter, or an amplifier configured to amplify the converted DC power.

The power transmission unit may further include an encoding unit configured to encode a power signal converted by the power conversion unit, using the codes allocated to the respective transmission coils.

The power transmission unit may further include a switch configured to control the power converted by the power conversion unit so as to be transmitted through a specific one of the at least two transmission coils.

In addition, the first detection signal and the second detection signal may be digital ping signals defined in a WPC standard or a PMA standard.

The code may be one of an orthogonal code and a pseudo noise code, but it is not limited thereto. It should be noted that other coding schemes which facilitate channel classification, encryption and demodulation may be used.

In addition, the first and second detection signals may be spread with the orthogonal code and then encrypted with the pseudo noise code.

In another embodiment, a wireless power receiver for wirelessly receiving power from a wireless power transmitter may include a reception coil, a frequency filter configured to filter first to n-th frequencies from a signal received through the reception coil, and a main controller configured to identify a frequency at which a detection signal is received, based on the filtered signal, wherein the main controller may control a signal strength indicator corresponding to the detection signal so as to be transmitted through the identified frequency.

In another embodiment, a wireless power receiver for wirelessly receiving power from a wireless power transmitter may include a reception coil, an operation frequency filter configured to perform frequency filtering so as to remove an operation frequency component from a signal received through the reception coil, a decoding unit configured to decode the frequency-filtered signal using first to n-th codes, and a main controller configured to identify a code with which a detection signal has been received, based on the decoded signal, we are the main controller may control a signal strength supporter corresponding to the detection signal so as be transmitted using the identified code.

In another embodiment, a method for transmitting wireless power to a wireless power receiver by a wireless power transmitter having a plurality of transmission coils may include simultaneously transmitting a first detection signal for detecting presence of the wireless power receiver using different frequencies allocated to the respective transmission coils, identifying at least one frequency corresponding to a transmission coil through which a first signal strength indicator corresponding to the first detection signal has been received, transmitting a second detection signal using the identified at least one frequency, and determining a frequency to be used for power transmission based on a second signal strength indicator received corresponding to the second detection signal.

In another embodiment, a method for transmitting wireless power to a wireless power receiver by a wireless power transmitter having a plurality of transmission coils may include simultaneously transmitting, through the plurality of transmission coils, a first detection signal encoded using differently codes allocated to the respective transmission coils, identifying at least one code corresponding to a transmission coil through which a first signal strength indicator corresponding to the first detection signal has been received, transmitting a second detection signal using the identified at least one code, and determining a code to be used for power transmission based on a second signal strength indicator received corresponding to the second detection signal In another embodiment, a method for receiving wireless power by a wireless power receiver from the wireless power transmitter may include identifying, from an AC signal received through a reception coil, at least one frequency at which a first detection signal has been received using N frequency filters, transmitting a first signal strength indicator corresponding to the first differential sense signal using the identified at least one frequency, selecting a frequency to be used for power reception based on a strength of a second detection signal received through the frequency filter corresponding to the identified at least one frequency, and transmitting a second signal strength indicator corresponding to the second detection signal using the selected frequency.

In another embodiment, a method for receiving wireless power by a wireless power receiver from the wireless power transmitter may include identifying at least one code with which a first detection signal has been received, based on output values of N decoders, transmitting a first signal strength indicator corresponding to the first detection signal using the identified at least one code, selecting a code to be used for power reception based on a strength of the second detection signal received through the decoders, and transmitting a second signal strength indicator corresponding to the second detection signal using the selected code.

In another embodiment, there may be provided a computer-readable recording medium having recorded thereon a program for executing any one of the wireless power transmission methods and the wireless power reception methods described above.

The above-described aspects of the present disclosure are merely a part of preferred embodiments of the present disclosure. Those skilled in the art will derive and understand various embodiments reflecting the technical features of the present disclosure from the following detailed description of the present disclosure.

Advantageous Effects

The method and device according to the embodiments have the following effects.

Embodiments provide a multi-coil wireless charging method and a device and system therefor.

In addition, embodiments provide a multi-coil wireless charging method capable of increasing the recognition rate of a wireless power receiver and minimizing the time required for recognition, and a device and system therefor.

In addition, according to embodiments, a time required for recognition of a wireless power receiver may be minimized by controlling a wireless power transmitter equipped with a plurality of transmission coils to simultaneously transmit detection signals through the respective transmission coils using different frequencies.

In addition, according to embodiments, a time required for recognition of a wireless power receiver may be minimized by controlling a wireless power transmitter equipped with a plurality of transmission coils to encode detection signals using different codes and simultaneously transmit the same through the respective transmission coils.

It will be appreciated by those skilled in the art that that the effects that can be achieved through the embodiments of the present disclosure are not limited to those described above and other advantages of the present disclosure will be more clearly understood from the following detailed description.

DESCRIPTION OF DRAWINGS

The accompanying drawings, which are included to provide a further understanding of the disclosure, illustrate embodiments of the disclosure. It is to be understood, however, that the technical features of the present disclosure are not limited to specific drawings, and the features disclosed in the drawings may be combined with each other to constitute a new embodiment.

The accompanying drawings, which are included to provide a further understanding of the disclosure, illustrate embodiments of the disclosure. It is to be understood, however, that the technical features of the present disclosure are not limited to specific drawings, and the features disclosed in the drawings may be combined with each other to constitute a new embodiment.

BEST MODE

Figure 1:
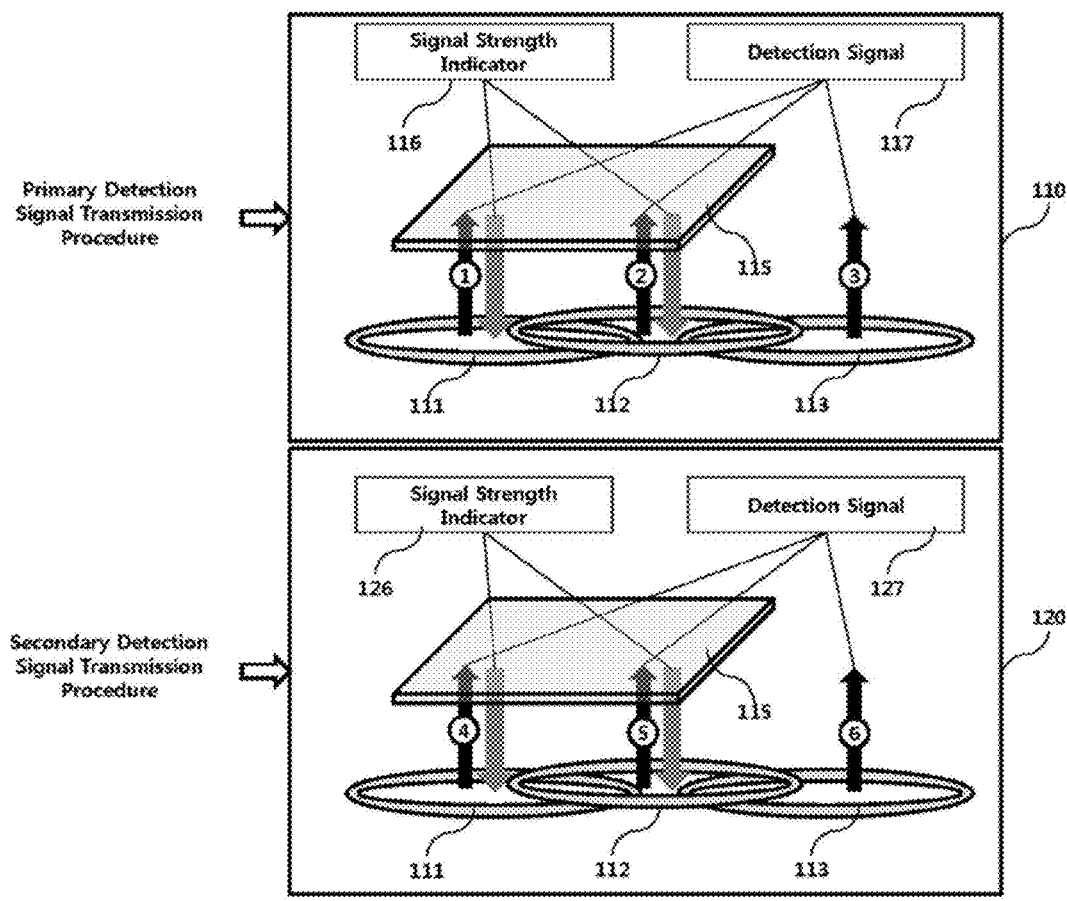
FIG. 1 is a diagram illustrating a detection signal transmission procedure in a wireless power transmitter according to the related art.

A wireless power transmitter for wirelessly transmitting power to a wireless power receiver according to an embodiment of the present disclosure may include a power transmission unit including at least two transmission coils, a controller configured to control first detection signals for detecting presence of a wireless power receiver so as to be transmitted simultaneously using different frequencies pre-allocated to the respective transmission coils, and a demodulation unit configured to transmit, when a first signal strength indicator corresponding to the first detection signal is received from the wireless power receiver, the received first signal strength indicator and a predetermined transmission coil identifier for identifying a transmission coil through which the first signal strength indicator has been received to the controller, wherein the controller may control a second detection signal so as to be transmitted through the transmission coil through which the first signal strength indicator has been received.

MODE FOR INVENTION

Hereinafter, an apparatus and various methods to which embodiments of the present disclosure are applied will be described in detail with reference to the drawings. As used herein, the suffixes "module" and "unit" are added or interchangeably used to facilitate preparation of this specification and are not intended to suggest distinct meanings or functions.

In the description of the embodiments, it is to be understood that, when an element is described as being "on"/"over" or "beneath"/"under" another element, the two elements may directly contact each other or may be arranged with one or more intervening elements present therebetween. Also, the terms "on"/"over" or "beneath"/"under" may refer to not only an upward direction but also a downward direction with respect to one element.

For simplicity, in the description of the embodiments, "wireless power transmitter," "wireless power transmission apparatus," "transmission terminal," "transmitter," "transmission apparatus," "transmission side," "wireless power transfer apparatus," "wireless power transferer," and the like will be interchangeably used to refer to an apparatus for transmitting wireless power in a wireless power system. In addition, "wireless power reception apparatus," "wireless power receiver," "reception terminal," "reception side," "reception apparatus," "receiver," and the like will be used interchangeably to refer to an apparatus for receiving wireless power from a wireless power transmission apparatus.

The transmitter according to the present disclosure may be configured as a pad type, a cradle type, an access point (AP) type, a small base station type, a stand type, a ceiling embedded type, a wall-mounted type, or the like. One transmitter may transmit power to a plurality of wireless power reception apparatuses. To this end, the transmitter may include at least one wireless power transmission means. Here, the wireless power transmission means may employ various wireless power transmission standards which are based on the electromagnetic induction scheme for charging according to the electromagnetic induction principle meaning that a magnetic field is generated in a power transmission terminal coil and current is induced in a reception terminal coil by the magnetic field. Here, the wireless power transmission means may include wireless charging technology using electromagnetic induction schemes defined by the Wireless Power Consortium (WPC) and the Power Matters Alliance (PMA), which are wireless charging technology standard organizations.

In addition, a receiver according to an embodiment of the present disclosure may include at least one wireless power reception means, and may receive wireless power from two or more transmitters simultaneously. Here, the wireless power reception means may include wireless charging technologies of electromagnetic induction schemes defined by the Wireless Power Consortium (WPC) and the Power Matters Alliance (PMA), which are wireless charging technology standard organizations.

The receiver according to the present disclosure may be employed in small electronic devices including a mobile phone, a smartphone, a laptop computer, a digital broadcasting terminal, a PDA (Personal Digital Assistant), a PMP (Portable Multimedia Player), a navigation device, an electric toothbrush, an electronic tag, a lighting device, a remote control, a fishing float, and wearable devices such as a smart watch. However, the embodiments are not limited thereto. The applications may include any devices which are equipped with a wireless power transmission means and have a rechargeable battery.

FIG. 1 is a diagram illustrating a detection signal transmission procedure in a wireless power transmitter according to the related art.

Referring to FIG. 1, the wireless power transmitter may be equipped with three transmission coils 111, 112, and 113. Each transmission coil may have a region partially overlapping the other transmission coils, and the wireless power transmitter sequentially transmits predetermined detection signals 117, 127 for sensing presence of a wireless power receiver through the respective transmission coils, for example, digital ping signals, in a predefined order.

As shown in FIG. 1, the wireless power transmitter may sequentially transmit detection signals 117 through a primary detection signal transmission procedure, which is indicated by reference numeral 110, and identify transmission coils 111 and 112 receiving a signal intensity indicator or signal strength indicator 116 from the wireless power receiver 115. Subsequently, the wireless power transmitter may sequentially transmit detection signals 127 through a secondary detection signal transmission procedure, which is indicated by reference numeral 120, identify a transmission coil exhibiting better power transmission efficiency (or charging efficiency), namely better alignment between the transmission coil and the reception coil, between the transmission coils 111 and 112 receiving the signal strength indicator 126, and perform a control operation to transmit power through the identified transmission coil, that is, to perform wireless charging.

Causing the wireless power transmitter to perform two detection signal transmission procedures as shown in FIG. 1 allows more accurate identification of a transmission coil that is better aligned with the reception coil of the wireless power receiver.

If the signal strength indicators 116 and 126 are received by the first transmission coil 111 and the second transmission coil 112 as indicated by reference numerals 110 and 120 of FIG. 1, the wireless power transmitter selects a transmission coil exhibiting the best alignment based on the signal strength indicator 126 received by each of the first transmission coil 111 and the second transmission coil 112 and performs wireless charging using the selected transmission coil.

Figure 2:
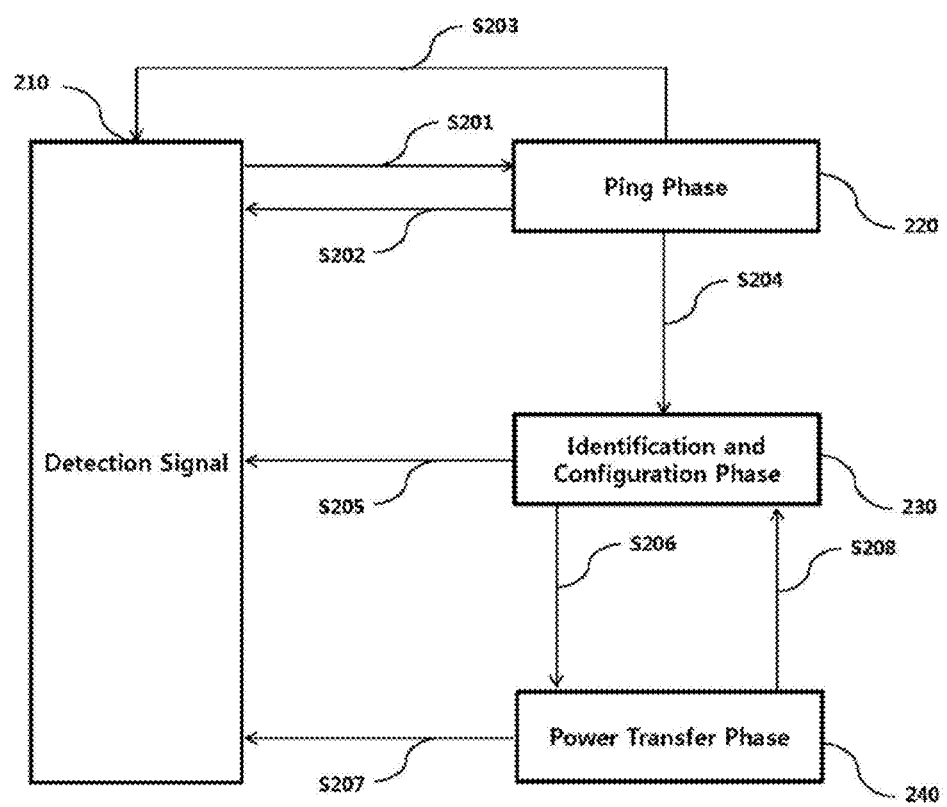
FIG. 2 is a state transition diagram illustrating a wireless power transmission procedure defined in the WPC standard.

FIG. 2 is a state transition diagram illustrating a wireless power transmission procedure defined in the WPC standard.

Referring to FIG. 2, power transmission from a transmitter to a receiver according to the WPC standard is broadly divided into a selection phase 210, a ping phase 220, an identification and configuration phase 230, and a power transfer phase 240.

The selection phase 210 may be a phase in which transition occurs when a specific error or a specific event is detected while power transmission begins or is maintained. Here, the specific error and the specific event will be clarified through the following description. Further, in the selection phase 210, the transmitter may monitor whether an object is present at the interface surface. When the transmitter detects an object being placed on the interface surface, it may transition to the ping phase 220 (S201). In the selection phase 210, the transmitter may transmit an analog ping signal of a very short pulse and sense whether there is an object in the active area of the interface surface based on the change in current of the transmission coils.

When the transmitter detects an object in the ping phase 220, it activates the receiver and transmits a digital ping to identify whether the receiver is a WPC standard-compatible receiver. If the transmitter does not receive a response signal (e.g., a signal strength indicator) for the digital ping from the receiver in the ping phase 220, it may transition back to the selection phase 210 (S202). In addition, if the transmitter receives, from the receiver, a signal indicating completion of power transmission, that is, a charge completion signal, the transmitter may transition to the selection phase 210 (S203).

Once the ping phase 220 is complete, the transmitter may transition to the identification and configuration phase 230 for identifying the receiver and collecting configuration and state information about the receiver (S204).

In the identification and configuration phase 230, the transmitter may transition to the selection phase 210 if an unexpected packet is received (unexpected packet), a desired packet is not received for a predefined time (timeout), there is an error in packet transmission (transmission error) or no power transfer contract is made (no power transfer contract) (S205).

Once identification and configuration of the receiver are complete, the transmitter may transition to the power transfer phase 240, wherein wireless power is transmitted (S206).

In the power transfer phase 240, the transmitter may transition to the selection phase 210 if an unexpected packet is received (unexpected packet), a desired packet is not received for a predefined time (timeout), a violation of a pre-established power transmission contract occurs (power transfer contract violation), and charging is complete (S207).

In addition, in the power transfer phase 240, if the power transfer contract needs to be reconfigured according to change in the state of the transmitter, the transmitter may transition to the identification and configuration phase 230 (S208).

The above-mentioned power transmission contract may be set based on the state and characteristics information about the transmitter and the receiver. For example, the transmitter state information may include information on a maximum amount of transmittable power and information on a maximum number of acceptable receivers, and the receiver state information may include information on the required power.

Figure 3:
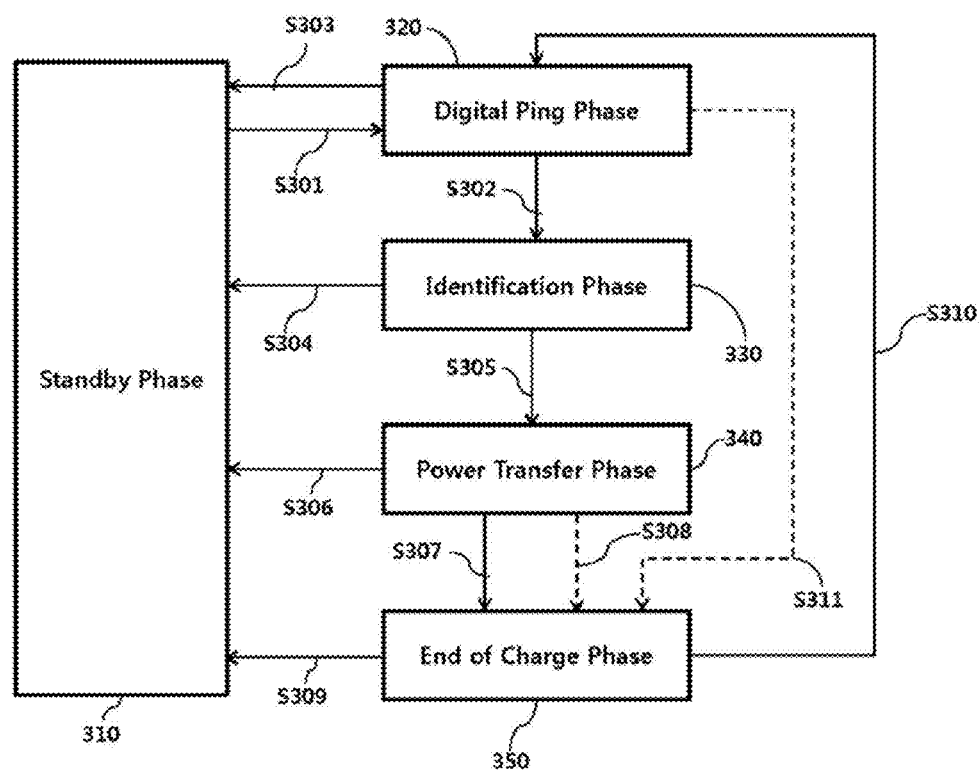
FIG. 3 is a state transition diagram illustrating a wireless power transmission procedure defined in the PMA standard.

FIG. 3 is a state transition diagram illustrating a wireless power transmission procedure defined in the PMA standard.

Referring to FIG. 3, power transmission from a transmitter to a receiver according to the PMA standard is broadly divided into a Standby phase 310, a Digital Ping phase 320, an Identification phase 330, a Power Transfer phase 340, and an End of Charge phase 350.

The Standby phase 310 may be a phase for performing transition when a specific error or a specific event is detected while a receiver identification procedure for power transmission is performed or power transmission is maintained. Here, the specific error and the specific event will be clarified through the following description. In addition, in the Standby phase 310, the transmitter may monitor whether an object is present on a charging surface. When the transmitter detects an object being placed on the charging surface or an RXID retry is in progress, it may transition to the Digital Ping phase 320 (S301). Here, RXID is a unique identifier assigned to a PMA-compatible receiver. In the Standby phase 310, the transmitter may transmit an analog ping very short pulse, and sense, based on the change in current of the transmission coil, whether there is an object in the active area of the interface surface, for example, the charging bed.

Upon transitioning to the Digital Ping phase 320, the transmitter sends a digital ping signal to identify whether the detected object is a PMA-compatible receiver. When sufficient power is supplied to the reception terminal by the digital ping signal transmitted by the transmitter, the receiver may modulate the received digital ping signal according to the PMA communication protocol and transmit a predetermined response signal to the transmitter. Here, the response signal may include a signal strength indicator indicating the strength of the power received by the receiver. When a valid response signal is received in the Digital Ping phase 320, the receiver may transition to the Identification phase 330 (S302).

If the response signal is not received or it is determined that the receiver is not a PMA-compatible receiver (i.e., Foreign Object Detection (POD)) in the Digital Ping phase 320, the transmitter may transition to the Standby phase 310 (S303). As an example, a foreign object (FO) may be a metallic object including a coin and a key.

In the Identification phase 330, the transmitter may transition to the Standby phase 310 if the receiver identification procedure fails or needs to be re-performed and if the receiver identification procedure is not completed for a predefined time (S304).

If the transmitter succeeds in identifying the receiver, the transmitter may transition from the Identification phase 330 to the Power Transfer phase 340 and initiate charging (S305).

In the Power Transfer phase 340, the transmitter may transition to the Standby phase 310 if a desired signal is not received within a predetermined time (timeout), a foreign object (FO) is detected, or the voltage of the transmission coil exceeds a predefined reference value (S306).

In addition, in the Power Transfer phase 340, the transmitter may transition to the End of Charge phase 350 if the temperature detected by a temperature sensor provided in the transmitter exceeds a predetermined reference value (S307).

In the End of Charge phase 350, if the transmitter determines that the receiver has been removed from the charging surface, the transmitter may transition to the Standby state 310 (S309).

In addition, if a temperature measured in the over-temperature state after lapse of a predetermined time drops below a reference value, the transmitter may transition from the End of Charge phase 350 to the Digital Ping phase 320 (S310).

In the Digital Ping phase 320 or the Power Transfer phase 340, the transmitter may transition to the End of Charge phase 350 when an End of Charge (EOC) request is received from the receiver (S308 and S311).

Figure 4:
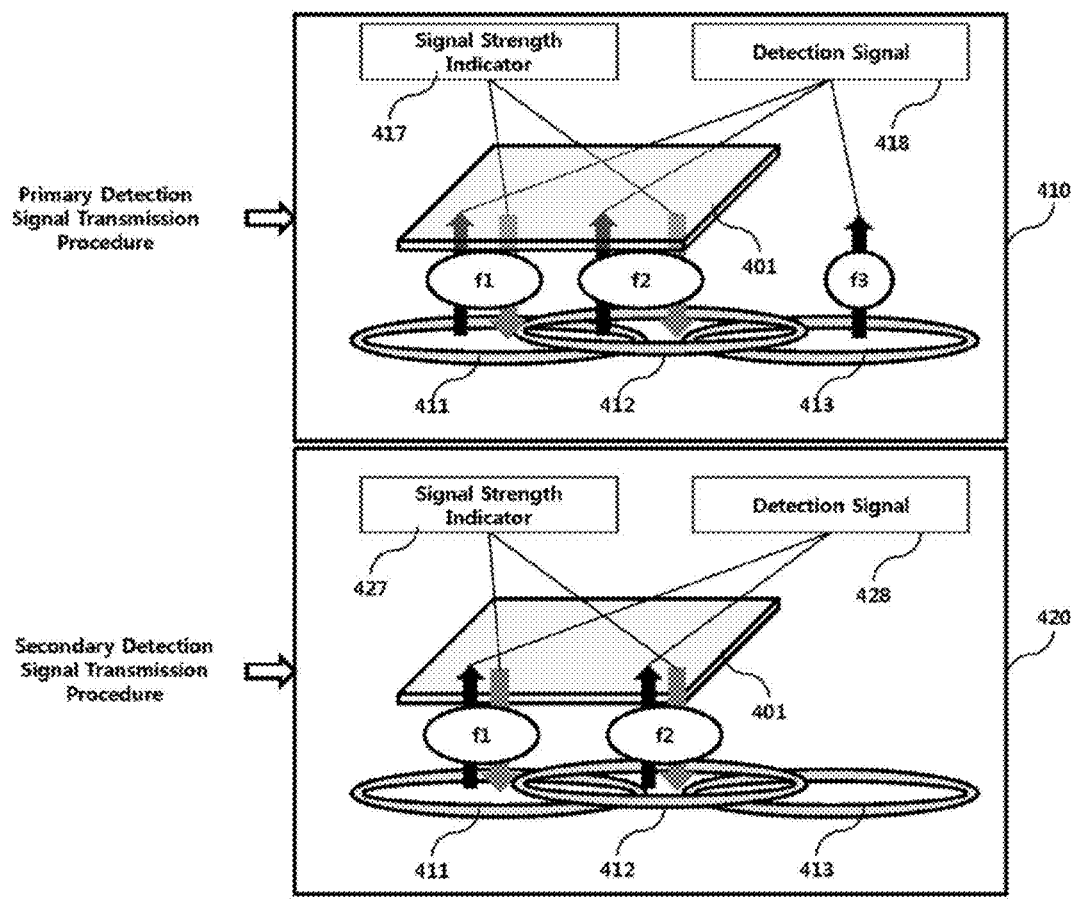
FIGS. 4 and 5 are diagrams illustrating a method of recognizing a wireless power receiver by simultaneously transmitting detection signals using different frequencies allocated to respective transmission coils according to an embodiment of the present disclosure.
Figure 5:
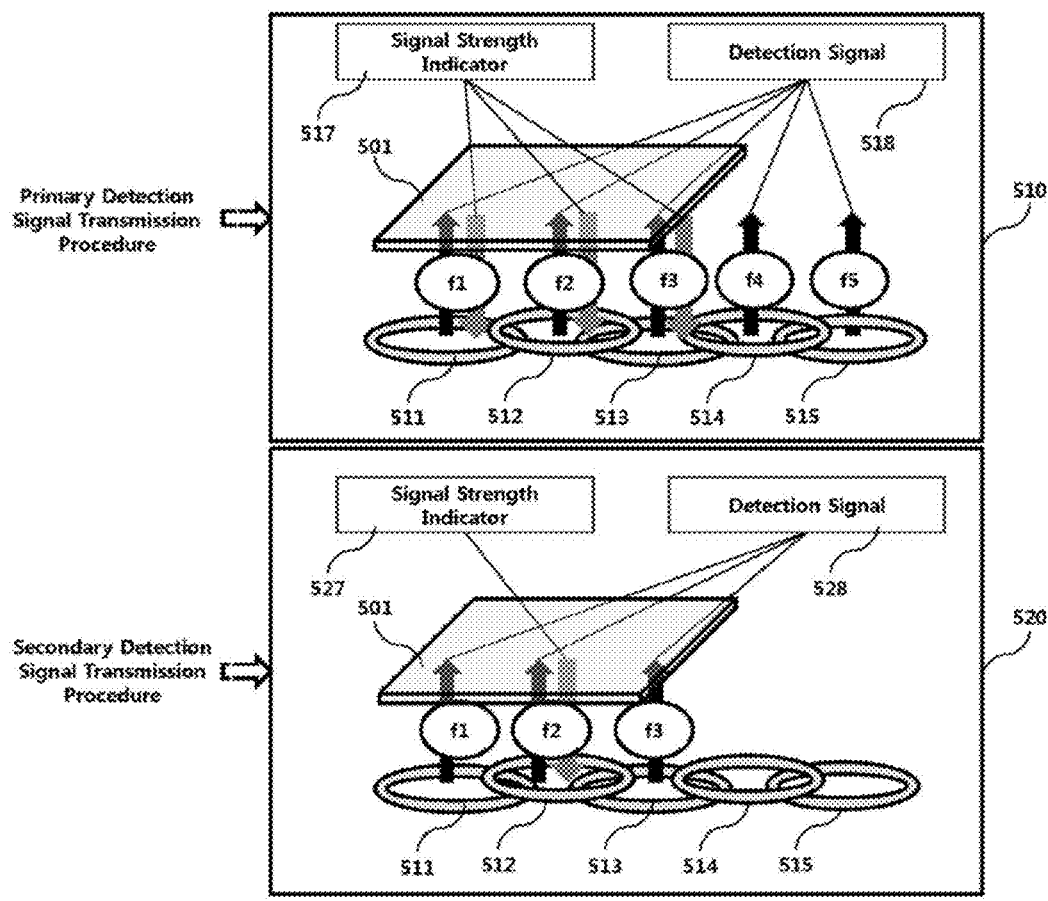

FIGS. 4 and 5 are diagrams illustrating a method of recognizing a wireless power receiver by simultaneously transmitting detection signals using different frequencies allocated to respective transmission coils according to an embodiment of the present disclosure.

Referring to FIG. 4, the wireless power transmitter may be equipped with three transmission coils 411, 412, and 413. Each transmission coil may have a region partially overlapping the other transmission coils. The wireless power transmitter may transmit an analog ping signal through each of the transmission coils or may transmit, when presence of a conductive object is detected using a predetermined detection sensor, predetermined detection signals 417 and 427, for example, digital ping signals, for identifying whether the object is a wireless power receiver capable of being wirelessly charged simultaneously, using specific frequencies allocated to the respective transmission coils.

For example, referring to FIG. 4, frequencies allocated to the first to third transmission coils 411, 412 and 413 respectively may be f1, f2, and f3, and f1, f2, and f3 may have different values.

In particular, as shown in FIG. 4, the wireless power transmitter according to this embodiment may use the different frequencies allocated to the respective transmission coils in the primary detection signal transmission procedure 410 to transmit the detection signals 418 simultaneously.

Subsequently, in the secondary detection signal transmission procedure 420, the detection signal 428 may be controlled to be transmitted only through the transmission coils 411 and 412 having received a signal strength indicator in the primary detection signal transmission procedure 410. Then, the wireless power transmitter may select a transmission coil, i.e., a frequency, to use for power transmission based on the value of the signal strength indicator received in the secondary detection signal transmission procedure 420.

If the value of the signal strength indicator received through frequency f1, i.e., the first transmission coil 411, between the signal strength indicators received in the secondary detection signal transmission procedure 420 is greater than the value of the signal strength indicator received through frequency f2, i.e., the second transmission coil 412, the wireless power transmitter may determine that frequency f1, i.e., the first transmission coil 411, should be used to perform wireless power transmission. Here, a greater value of the signal strength indicator may mean a higher intensity of power received at the reception terminal. For example, the signal strength indicator may be determined based on the intensity of the output power of the rectifier of the reception terminal, but embodiments are not limited thereto. The signal strength indicator may be determined based on the output voltage of the rear end of the DC/DC converter or the battery.

The detection signals 418 and 428 according to the embodiment of FIG. 4 may be digital ping signals defined in the WPC standard and the PMA standard.

Referring to FIG. 5, a wireless power transmitter according to another embodiment of the present disclosure may be equipped with five transmission coils 511 to 515. During a first differential detection signal transmission procedure 510, the wireless power transmitter may simultaneously transmit detection signals 518 using different frequencies f1, f2, f3, f4, and f5 for the respective coils. At this time, the wireless power transmitter may receive a signal strength indicator 517 corresponding to the detection signals transmitted by the first to third transmission coils 511, 512, 513 from a wireless power receiver 501.

In this case, in the secondary detection signal transmission procedure 520, the wireless power transmitter may perform a control operation such that the detection signal 528 is transmitted only through the first to third transmission coils 511, 512 and 513 through which the signal strength indicator 517 has been received in the primary detection signal transmission procedure and is not transmitted through the fourth and fifth transmission coils 514 and 515.

The wireless power receiver 501 may select a frequency corresponding to the strongest detection signal among the detection signals received during the secondary detection signal transmission procedure 520. Here, suppose that the selected frequency is f2. In this case, the wireless power receiver 501 may transmit only the signal strength indicator corresponding to the detection signal received through frequency f2.

Thereafter, the wireless power transmitter may perform a receiver identification procedure and a power transmission procedure using the transmission coil 512, i.e., frequency f2, through which the signal strength indicator 527 has been received during the secondary detection signal transmission procedure 520.

Figure 6:
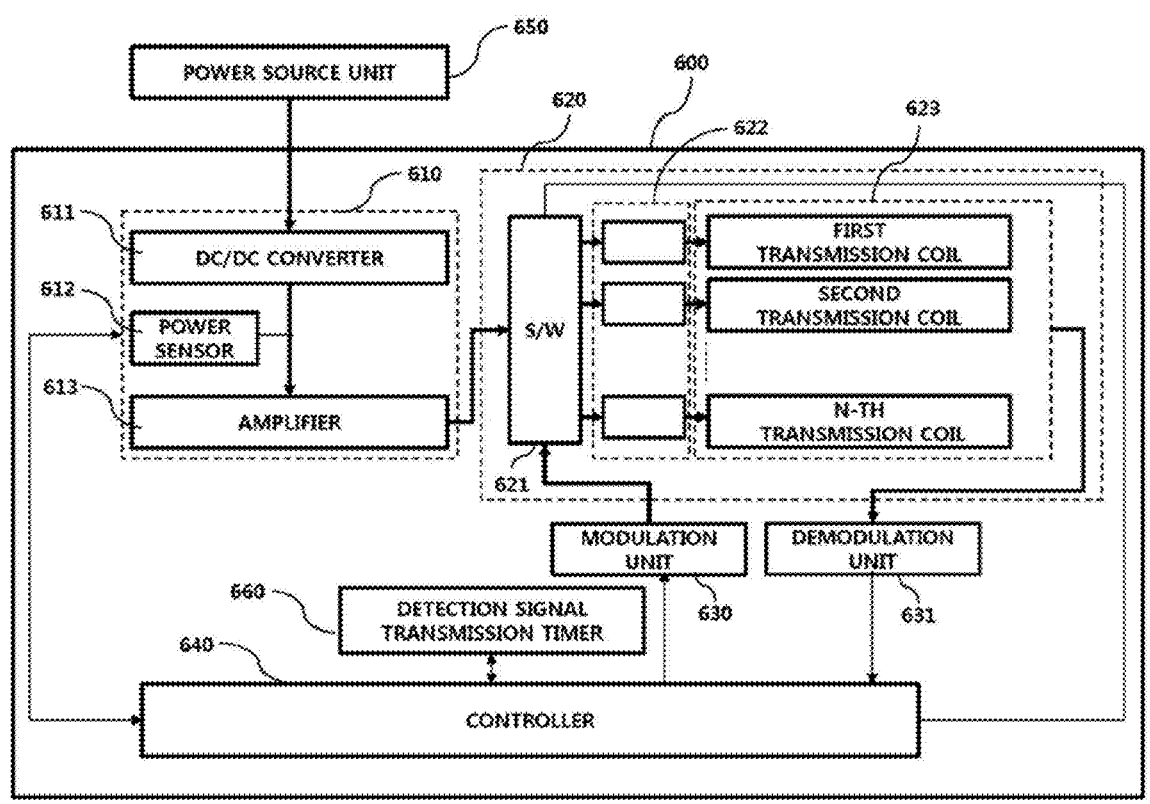
FIG. 6 is a block diagram illustrating the structure of a multi-coil wireless power transmitter capable of transmitting detection signals using different frequencies allocated to respective transmission coils according to an embodiment of the present disclosure.

FIG. 6 is a block diagram illustrating the structure of a multi-coil wireless power transmitter capable of transmitting detection signals using different frequencies allocated to respective transmission coils according to an embodiment of the present disclosure.

Referring to FIG. 6, the wireless power transmitter 600 may include a power conversion unit 610, a power transmission unit 620, a modulation unit 630, a demodulation unit 631, a controller 640, and a detection signal transmission timer 660. It should be noted that the elements of the wireless power transmitter 600 described above are not necessarily essential elements, and thus the wireless power transmitter may be configured to include more or fewer elements.

As shown in FIG. 6, when power is supplied from a power source unit 650, the power conversion unit 610 may function to convert the power into power having a predetermined intensity.

To this end, the power conversion unit 610 may include a DC/DC converter 611, a power sensor 612, and an amplifier 613.

The DC/DC converter 611 may function to convert DC power supplied from the power source unit 650 into DC power having a specific intensity according to a control signal of the controller 640.

The power sensor 612 may measure the voltage/current and the like of the DC-converted power and provide the same to the controller 640.

The controller 640 may adaptively cut off power supplied from the power source unit 650 or power supplied to the amplifier 613, based on the value of the voltage/current measured by the power sensor 612. To this end, a predetermined power cutoff circuit for cutting off power supplied from the power source unit 650 or power supplied to the amplifier 613 may be further provided at one side of the power conversion unit 610.

The amplifier 613 may adjust the intensity of the DC/DC-converted power according to a control signal of the controller 640. For example, the controller 640 may receive a predetermined power control signal generated by the wireless power receiver through the demodulation unit 631, and adjust the amplification factor of the amplifier 613 according to the received power control signal.

The power transmission unit 620 may include a switch (or multiplexer) 621, a carrier generator 622, and a transmission coil 623.

The carrier generator 622 may function to generate AC power by inserting an AC component having a specific frequency into the DC output power of the amplifier 613 received through the switch 621 and transmit the AC power to the corresponding transmission coil. In this case, the frequencies of the AC power transmitted to the respective transmission coils may be different from each other. In another embodiment of the present disclosure, the resonance frequency may be set differently for each transmission coil using a predetermined frequency controller having a function of adjusting the LC resonance characteristics differently for the respective transmission coils.

As shown in FIG. 6, the power transmission unit 620 may include a switch 621 for controlling transmission of the output power of the amplifier 613 to a transmission coil, and first to n-th transmission coils 622.

The controller 640 may control the switch 621 to simultaneously transmit the detection signals through the first to n-th transmission coils 622 during the primary detection signal transmission procedure. At this time, the controller 640 may identify, through the detection signal transmission timer 660, a time to transmit the detection signals. When the time reaches the detection signal transmission duration, the controller 640 may control the switch 621 to transmit the detection signals through the corresponding transmission coils.

In addition, during the primary detection signal transmission procedure, the controller 640 may receive a predetermined transmission coil identifier for identifying a transmission coil through which a signal strength indicator has been received from the demodulation unit 631 and the signal strength indicator received through the corresponding transmission coil. Subsequently, in the secondary detection signal transmission procedure, the controller 640 may control the switch 621 such that the detection signal may be transmitted only through the transmission coil(s) through which the signal strength indicator has been received during the primary detection signal transmission procedure. In another example, when there is a plurality of transmission coils through which the signal strength indicators have been received during the first differential detection signal transmission procedure, the controller 640 may determine a transmission coil through which a signal strength indicator having the greatest value has been received as a transmission coil through which a detection signal is to be transmitted in the secondary detection signal transmission procedure, and control the switch 621 according to the result of the determination.

The modulation unit 630 may modulate the control signal generated by the controller 640 and transfer the modulated control signal to the switch 621. Here, the modulation schemes for modulating the control signal may include frequency shift keying (FSK), Manchester coding, phase shift keying (PSK), and pulse width modulation.

When a signal received through a transmission coil is detected, the demodulation unit 631 may demodulate the detected signal and transmit the demodulated signal to the controller 640. Here, the demodulated signal may include a signal control indicator, an error correction (EC) indicator for power control during wireless power transmission, an EOC (end of charge) indicator, and an overvoltage/overcurrent/overheat indicator, but embodiments are not limited thereto. The demodulated signal may include various kinds of state information for identifying the state of the wireless power receiver.

In addition, the demodulation unit 631 may identify the transmission coil through which the demodulated signal has been received and provide the controller 640 with a predetermined transmission coil identifier corresponding to the identified transmission coil.

Further, the demodulation unit 631 may demodulate the signal received through the transmission coil 623 and transfer the demodulated signal to the controller 640. For example, the demodulated signal may include, but is not limited to, a signal strength indicator. The demodulated signal may include various kinds of state information about the wireless power receiver.

In an example, the wireless power transmitter 600 may acquire the signal strength indicator through in-band communication, which is performed to communicate with the wireless power receiver, using the same frequency as used for wireless power transmission.

In addition, the wireless power transmitter 600 may not only transmit wireless power using the transmission coil 623, but also exchange various kinds of information with the wireless power receiver via the transmission coil 623. In another example, it should be noted that the wireless power transmitter 600 may include separate coils corresponding to each transmission coil 623 and perform in-band communication with the wireless power receiver using the separate coils.

Figure 7:
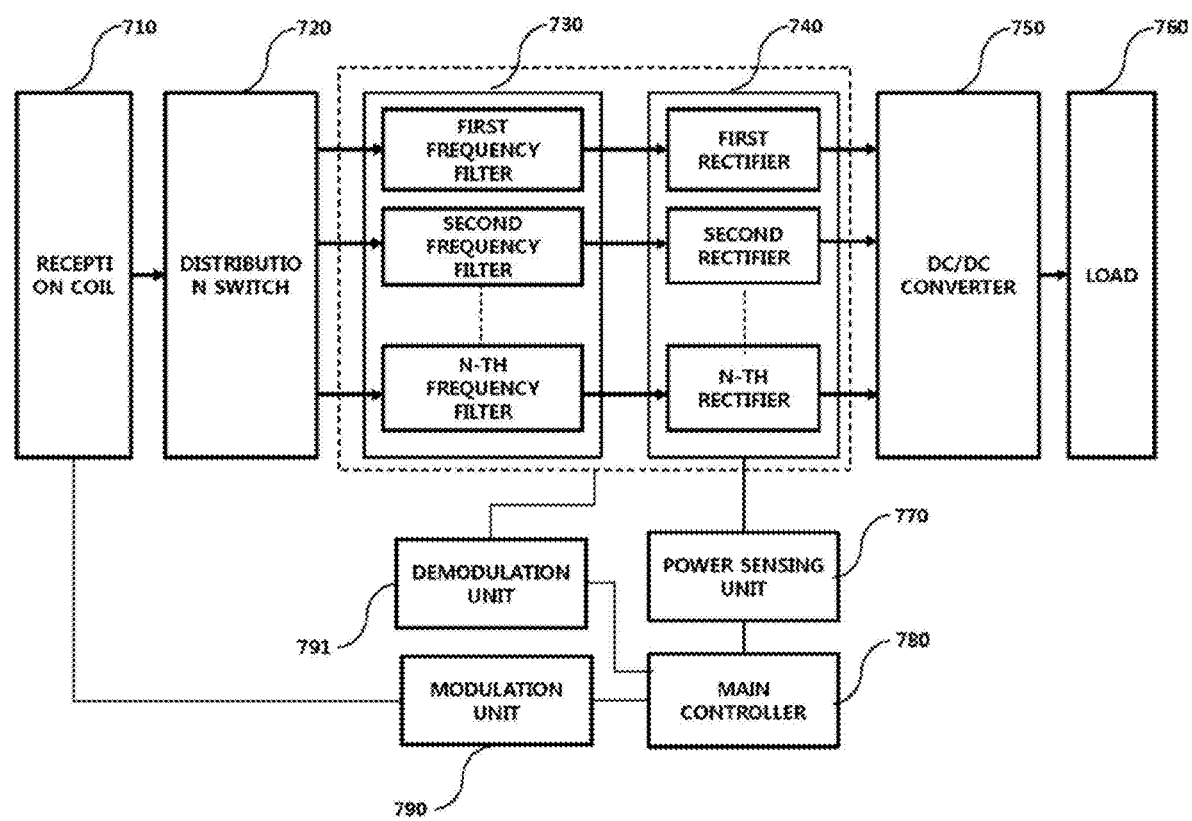
FIG. 7 is a block diagram illustrating the structure of a wireless power receiver operatively connected with the wireless power transmitter according to FIG. 6.

FIG. 7 is a block diagram illustrating the structure of a wireless power receiver operatively connected with the wireless power transmitter according to FIG. 6.

Referring to FIG. 7, a wireless power receiver 700 may include a reception coil 710, a distribution switch 720, a frequency filter 730, a rectification unit 740, a DC/DC converter 750, a load 760, a power sensing unit 770, a main controller 780, a modulation unit 790, and a demodulation unit 791.

AC power received via the reception coil 710 may be transferred to a frequency filter 730 via the distribution switch 720. At this time, the frequency filter 730 may filter a plurality of different carrier frequencies and transmit the filtered power to the rectification unit 740. The rectification unit 740 may convert the filtered AC power into DC power and transmit the DC power to the DC/DC converter 750. The DC/DC converter 750 may convert the intensity of the rectifier DC output power into an intensity required for a load 760 and transfer the converted power to the load 760.

The power sensing unit 770 may measure the intensity of the DC output power of each of the first to n-th rectifiers included in the rectification unit 740 and provide the same to the main controller 780.

For example, the main control section 780 may identify a rectifier having the measured intensity of the rectifier DC output power greater than or equal to a predetermined reference value, and control the modulation unit 790 to transmit a signal strength indicator using a carrier frequency corresponding to the identified rectifier. That is, when the intensity of the rectifier DC output power is greater than or equal to the predetermined reference value, the main controller 780 may determine that a detection signal has been received. Upon receiving the detection signal, the main controller may control the modulation unit 790 to transmit a signal strength indicator corresponding to the detection signal using the carrier frequency used for transmission of the detection signal.

In another example, the demodulation unit 791 may demodulate the output of the frequency filter 730 or the output of the rectification unit 740 to identify whether or not a detection signal is received, and may provide the main controller 780 with information about the carrier frequency used to transmit the identified detection signal. At this time, the main controller 780 may control the signal strength indicator to be transmitted through the modulation unit 790 using the same frequency as the carrier frequency used for transmission of the identified detection signal.

Figure 8:
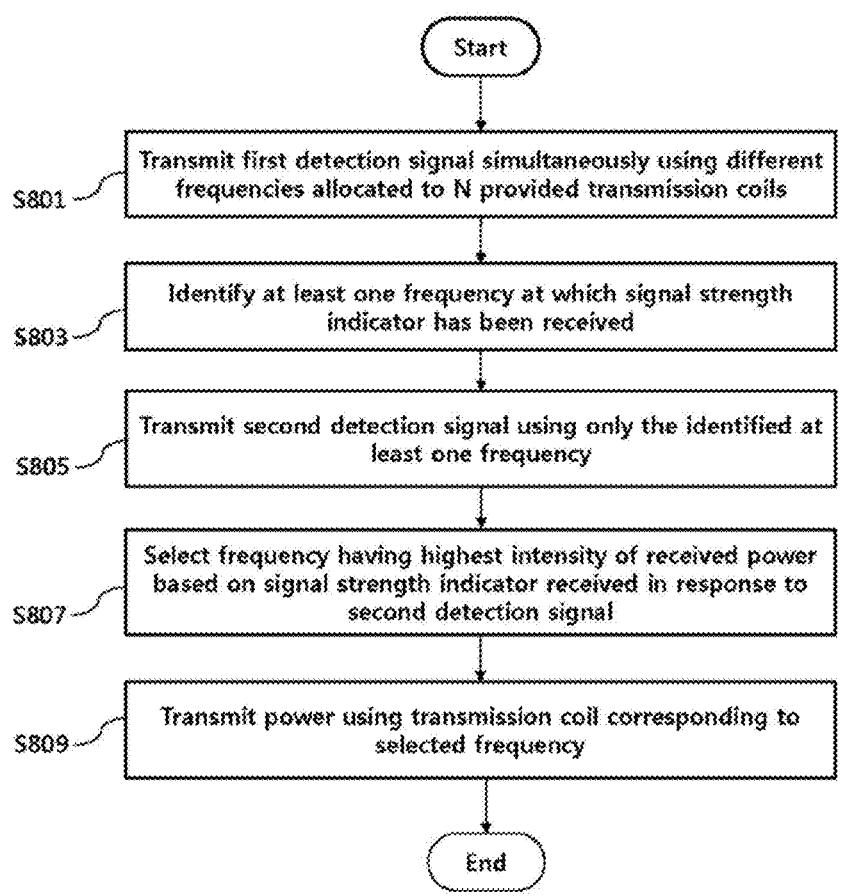
FIG. 8 is a flowchart illustrating a multi-coil wireless charging method in a multi-coil wireless power transmitter capable of transmitting a detection signal using different frequencies for respective transmission coils according to an embodiment of the present disclosure.

FIG. 8 is a flowchart illustrating a multi-coil wireless charging method in a multi-coil wireless power transmitter capable of transmitting a detection signal using different frequencies for respective transmission coils according to an embodiment of the present disclosure.

Referring to FIG. 8, the wireless power transmitter may simultaneously transmit first detection signals using different frequencies allocated to the N transmission coils provided thereto, that is, carrier frequencies (S801).

The wireless power transmitter may identify at least one frequency at which a signal strength indicator has been received (S803), and transmit a second detection signal using only the identified at least one frequency (S805).

The wireless power transmitter may select a frequency having the highest intensity of power received from the wireless power receiver, based on the signal strength indicator received in response to the second detection signal (S807). As an example, there may be a plurality of signal strength indicators received through the transmission coils in the wireless power transmitter according to transmission of the second detection signal. In this case, the wireless power transmitter may use a transmission coil through which a signal strength indicator having the greatest value is received, for power transmission to the wireless power receiver.

Thereafter, the wireless power transmitter may transmit power using the transmission coil corresponding to the selected frequency (S809).

Figure 9:
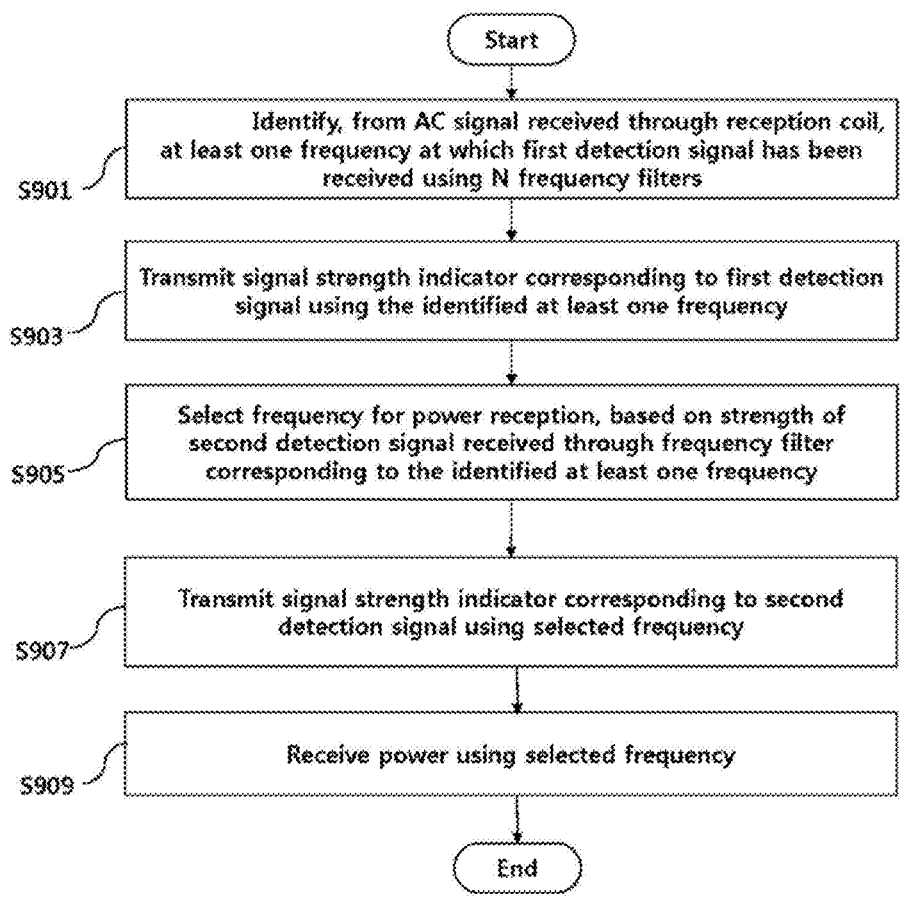
FIG. 9 is a flowchart illustrating a multi-coil wireless charging method in a wireless power receiver capable of receiving a detection signal transmitted using different frequencies for respective transmission coils according to an embodiment of the present disclosure.

FIG. 9 is a flowchart illustrating a multi-coil wireless charging method in a wireless power receiver capable of receiving a detection signal transmitted using different frequencies for respective transmission coils according to an embodiment of the present disclosure.

Referring to FIG. 9, the wireless power receiver may distribute an AC signal received through a reception coil to N frequency filters, and then identify at least one frequency at which the first detection signal has been received, based on output power values of N rectifiers connected to the N frequency filters, respectively (S901).

The wireless power receiver may transmit a signal strength indicator corresponding to the first detection signal using the at least one identified frequency (S903).

The wireless power receiver may select one frequency to use for power reception, based on the strength of the second detection signal received through the frequency filter corresponding to the at least one frequency identified in operation S901 (S905).

The wireless power receiver may transmit a signal strength indicator corresponding to the second detection signal using the frequency selected in operation S905 (S907).

Thereafter, the wireless power receiver may transfer the received power to the load using the frequency filter and the rectifier corresponding to the frequency selected in operation S907 to perform the charging operation (S909).

Figure 10:
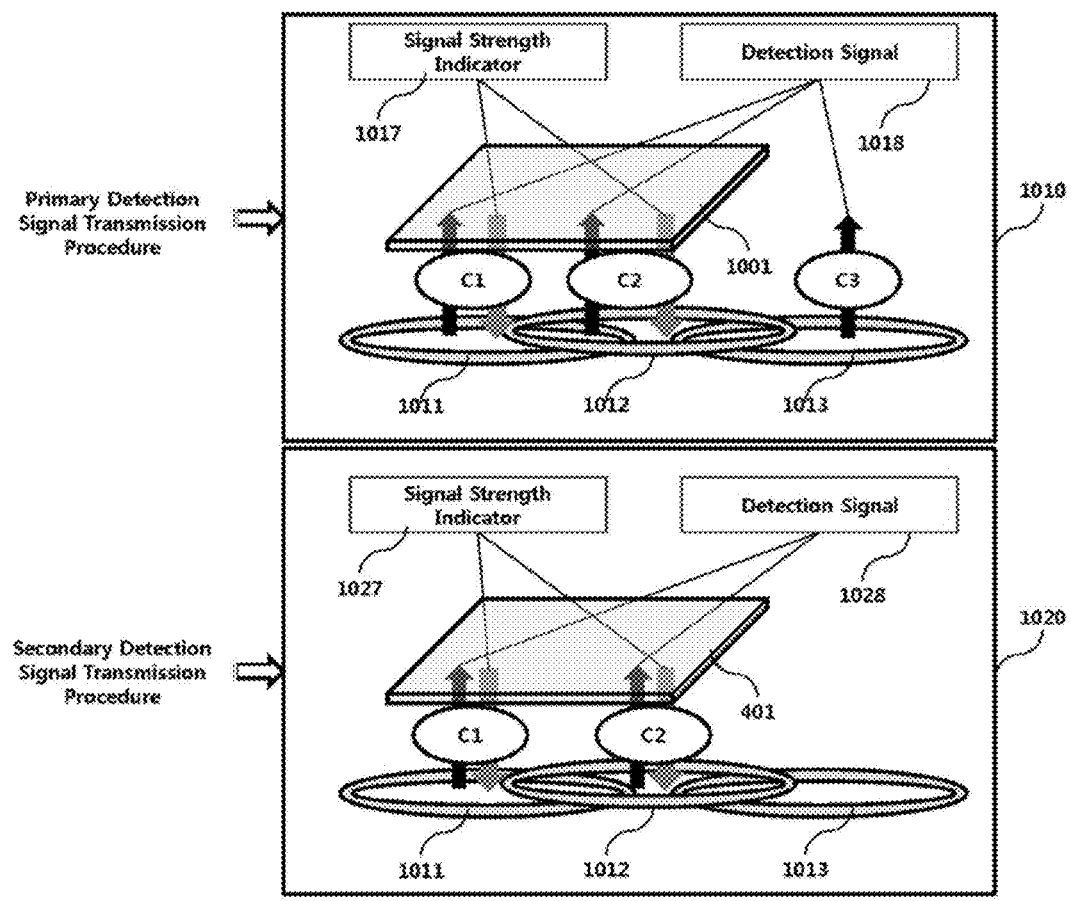
FIGS. 10 to 11 are diagrams illustrating a method of recognizing a wireless power receiver by simultaneously transmitting detection signals encrypted with different codes for respective transmission coils according to an embodiment of the present disclosure.
Figure 11:
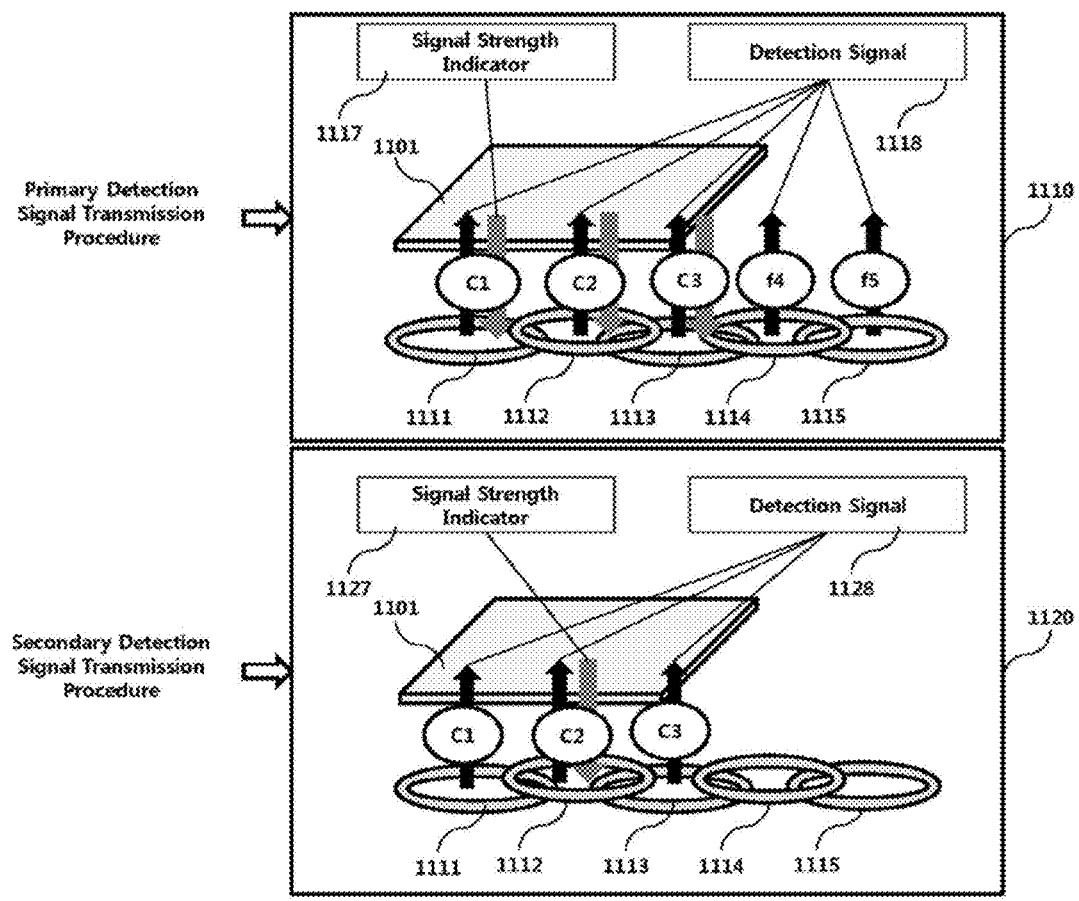

FIGS. 10 to 11 are diagrams illustrating a method of recognizing a wireless power receiver by simultaneously transmitting detection signals encrypted with different codes for respective transmission coils according to an embodiment of the present disclosure.

Referring to FIG. 10, the wireless power transmitter may include three transmission coils 1011, 1012, and 1013. Hereinafter, for simplicity, the three transmission coils will be referred to as a first transmission coil 1011, a second transmission coil 1022, and a second transmission coil 1022, respectively.

Each transmission coil may have a region partially overlapping the other transmission coils, and the wireless power transmitter may transmit an analog ping signal to sense presence of a conductive object in a chargeable area through each of the transmission coils.

In another example, the wireless power transmitter may include a predetermined sensor for sensing whether an object is present in the chargeable area, and presence of a conductive object may be detected based on the result of detection of the detection sensor.

If presence of a conductive object is detected, the wireless power transmitter may encode and (or) modulate predetermined detection signals 1018 and 1028, which may be digital ping signals defined in the PMA standard and the WPC standard, for identifying if the object is a wireless rechargeable wireless power receiver using specific codes differently allocated to each of the first to third transmission coils, and then transmit the same simultaneously.

Here, the employed codes may be codes that minimize interference between the encoded signals due to lack of correlation between the codes and facilitates differentiation of the signals at the reception terminal. Orthogonal codes or Walsh codes may be used, but embodiments are not limited thereto.

An orthogonal code or a Walsh code may be used as a spreading code for acquiring a spreading gain. In addition, a spread signal may be encoded with a predetermined PN (pseudonoise) code for encryption.

For example, referring to FIG. 10, the codes allocated to each of the first to third transmission coils 1011, 1012, and 1013 may be C1, C2, and C3, which may have orthogonality with each other.

In particular, as shown in FIG. 10, the wireless power transmitter according to this embodiment may simultaneously transmit the detection signal 1018 encoded using different codes allocated to the respective corresponding transmission coils during the primary detection signal transmission procedure 1010.

Subsequently, in the secondary detection signal transmission procedure 1020, the wireless power transmitter may perform a control operation to transmit a second detection signal 1028 only through the transmission coils 1011 and 1012 through which the signal strength indicators have been received during the primary detection signal transmission procedure 1010.

Then, the wireless power transmitter may select a transmission coil, i.e., a code, to use for power transmission based on the values of the signal strength indicators received in the secondary detection signal transmission procedure 1020.

If the value of the signal strength indicator received through the code C1, i.e., the first transmission coil 1011, between the signal strength indicators received in the secondary detection signal transmission procedure 1020 is greater than the value of the signal strength indicator received through code C2, i.e., the second transmission coil 1012, the wireless power transmitter may control code C1, i.e., the first transmission coil 1011, to be used for power transmission for the wireless power receiver. Here, a greater value of the signal strength indicator may mean a higher intensity of power received at the reception terminal.

For example, the signal strength indicator may be determined based on the intensity of the output power of the rectifier of the reception terminal, but embodiments are not limited thereto. The signal strength indicator may be determined based on the output voltage of the rear end of the DC/DC converter or the battery.

The detection signals 1018 and 1028 according to the embodiment of FIG. 10 may be digital ping signals defined in the WPC standard and the PMA standard.

Referring to FIG. 11, a wireless power transmitter according to another embodiment of the present disclosure may include five transmission coils 1111 to 1115. During the primary detection signal transmission procedure 1110, the wireless power transmitter may simultaneously transmit detection signals 1118 encoded using different codes C1, C2, C3, C4 and C5 for the respective transmission coils. At this time, the wireless power transmitter may receive, from the wireless power receiver 1101, a signal strength indicator 1117 corresponding to the detection signals transmitted by the first to fifth transmission coils 1111 to 1115.

In this case, in the secondary detection signal transmission procedure 1120, the wireless power transmitter may perform a control operation such that a detection signal 1128 is transmitted only through the first to third transmission coils 1111, 1112 and 1113, through which the signal strength indicator 1117 has been received in the primary detection signal transmission procedure 1120 and no detection signal is transmitted through the fourth and fifth transmission coils 1114 and 1115.

The wireless power receiver 1101 may select a code corresponding to a detection signal having the highest strength among the detection signals received during the secondary detection signal transmission procedure 1120. Here, suppose that the selected code is C2. In this case, the wireless power receiver 1101 may encode only the signal strength indicator corresponding to the detection signal encoded with code C2 and transmit the same.

Thereafter, the wireless power transmitter may perform a receiver identification procedure and a power transmission procedure using the transmission coil 1112, i.e., code C2 through which the signal strength indicator 1127 has been received during the secondary detection signal transmission procedure 1120.

Figure 12:
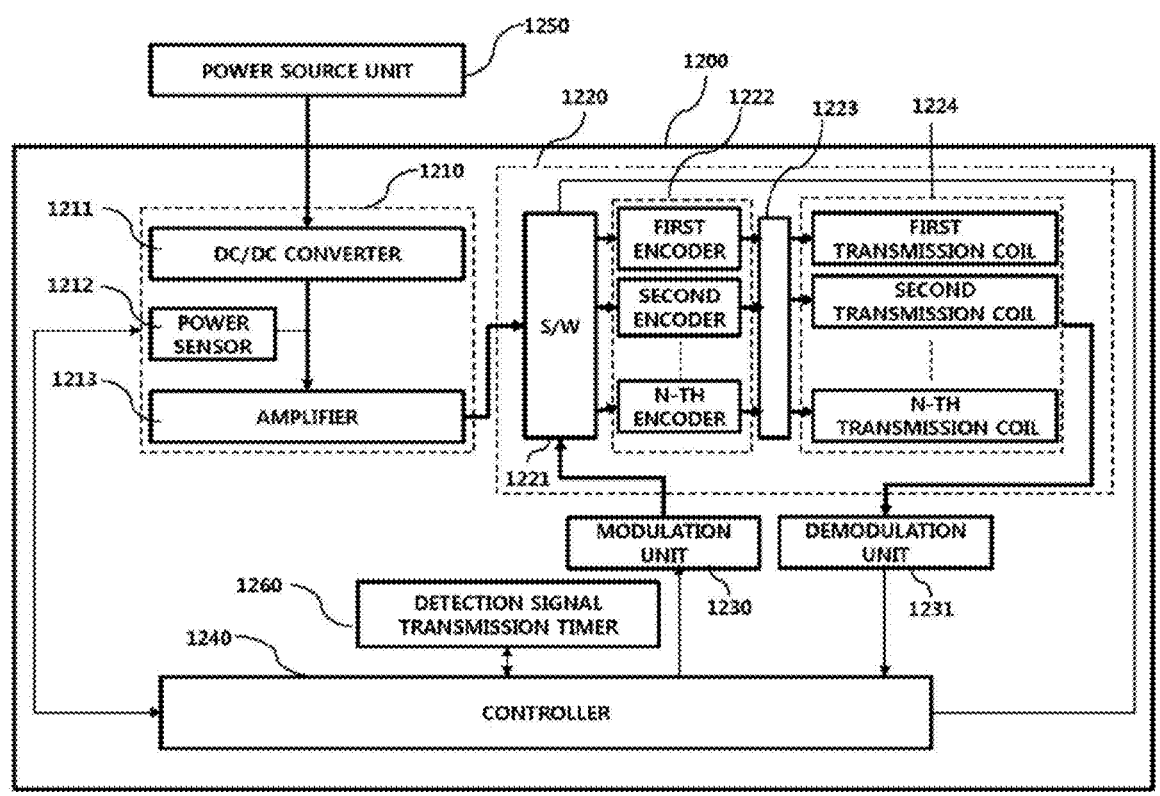
FIG. 12 is a block diagram illustrating the structure of a wireless power transmitter capable of transmitting detection signals encrypted with different codes for respective transmission coils according to an embodiment of the present disclosure.

FIG. 12 is a block diagram illustrating the structure of a wireless power transmitter capable of transmitting detection signals encrypted with different codes for respective transmission coils according to an embodiment of the present disclosure.

Referring to FIG. 12, the wireless power transmitter 1200 may include a power conversion unit 1210, a power transmission unit 1220, a modulation unit 1230, a demodulation unit 1231, a controller 1240, and a detection signal transmission timer 1260. It should be noted that the elements of the wireless power transmitter 1200 described above are not necessarily essential elements, and thus the wireless power transmitter may be configured to include more or fewer elements.

As shown in FIG. 12, when power is supplied from the power supply 1250, the power conversion unit 1210 may convert the power to a predetermined intensity.

To this end, the power conversion unit 1210 may include a DC/DC converter 1211, a power sensor 1212, and an amplifier 1213. In another example, in the case where the power supplied from the power source unit 1250 is AC power, the power conversion unit 1210 may further include an AC/DC converter (not shown).

The DC/DC converter 1211 may function to convert DC power supplied from the power source unit 1250 into DC power having a specific intensity according to a control signal of the controller 1240.

The power sensor 1212 may measure the voltage/current and the like of the DC-converted power and provide the same to the controller 1240. As another example, the wireless power transmitter 600 may further include a temperature sensor (not shown) for measuring the internal temperature. In this case, when it is determined that the internal temperature rises above a predetermined reference value and is in the overheat state, the controller 1240 may cut off power supplied from the power source unit 1250 or control the power conversion unit 1210 to reduce the intensity of power output by the power transmission unit 1260.

The controller 1240 may adaptively cut off power supplied from the power source unit 1250 or power supplied to the amplifier 1213, based on the value of the voltage/current measured by the power sensor 1212. To this end, a predetermined power cutoff circuit for cutting off power supplied from the power source unit 1250 or power supplied to the amplifier 1213 may be further provided at one side of the power conversion unit 1210.

The amplifier 1213 may adjust the intensity of the DC/DC-converted power according to a control signal of the controller 1240. For example, the controller 1240 may receive a predetermined power control signal generated by the wireless power receiver through the demodulation unit 1231 and adjust the amplification factor of the amplifier 1213 according to the received power control signal.

The power transmitting unit 1220 may include a switch (or multiplexer) 1221, an encoding unit 1222, an operation frequency generator 1223, and a transmission coil 1223.

The encoding unit 1222 may generate a specific code and encode the generated code into the DC output power signal of the amplifier 1213 received through the switch 1221, and then provide the encoded signal to the operation frequency generator 1223. Here, the codes allocated to the respective transmission coils may be different from each other. As shown in FIG. 12, the encoding unit 1222 may include N encoders configured to perform encoding with different codes.

The operation frequency generator 1223 may function to load a specific carrier frequency signal to be used for power transmission onto the encoded signal. The signal carrying the carrier frequency may be transferred to the transmission coil 1224 and transmitted wirelessly.

The controller 1240 may control the switch 1221 to simultaneously transmit the detection signals through the first to n-th transmission coils 1224 during the primary detection signal transmission procedure. At this time, the controller 1240 may identify, through the detection signal transmission timer 1260, a time to transmit the detection signals. When the time reaches the detection signal transmission duration, the controller 1240 may control the switch 1221 to transmit the detection signals through the corresponding transmission coils.

In addition, during the primary detection signal transmission procedure, the controller 1240 may receive a predetermined transmission coil identifier for identifying a transmission coil through which a signal strength indicator has been received from the demodulation unit 1231 and the signal strength indicator received through the corresponding transmission coil. Subsequently, in the secondary detection signal transmission procedure, the controller 1240 may control the switch 1221 such that the detection signal may be transmitted only through the transmission coil(s) through which the signal strength indicator has been received during the primary detection signal transmission procedure. In another example, when there is a plurality of transmission coils through which the signal strength indicators have been received during the first differential detection signal transmission procedure, the controller 1240 may determine a transmission coil through which a signal strength indicator having the greatest value has been received as a transmission coil through which a detection signal is to be transmitted in the secondary detection signal transmission procedure, and control the switch 1221 according to the result of the determination.

The modulation unit 1230 may modulate the control signal generated by the controller 1240 and transfer the modulated control signal to the switch 1221. Here, the modulation schemes for modulating the control signal may include frequency shift keying (FSK), Manchester coding, phase shift keying (PSK), and pulse width modulation.

When a signal received through a transmission coil is detected, the demodulation unit 1231 may demodulate the detected signal and transmit the demodulated signal to the controller 1240. Here, the demodulated signal may include a signal control indicator, an error correction (EC) indicator for power control during wireless power transmission, an EOC (end of charge) indicator, and an overvoltage/overcurrent/overheat indicator, but embodiments are not limited thereto. The demodulated signal may include various kinds of receiver state information for identifying the state of the wireless power receiver.

In addition, the demodulation unit 1231 may identify the transmission coil through which the demodulated signal has been received and provide the controller 1240 with a predetermined transmission coil identifier corresponding to the identified transmission coil.

Further, the demodulation unit 1231 may demodulate the signal received through the transmission coil 1223 and transfer the demodulated signal to the controller 1240. For example, the demodulated signal may include a signal strength indicator.

In an example, the wireless power transmitter 1200 may receive a signal strength indicator encoded with the same code as the code used for transmission of the detection signal through the same transmission coil as used for transmission of the detection signal.

That is, the wireless power transmitter 1200 may not only transmit wireless power using the transmission coil 1224, but also exchange various kinds of information with the wireless power receiver through in-band communication.

In another example, it should be noted that the wireless power transmitter 1200 may include separate coils corresponding to each transmission coil 1223 and perform in-band communication with the wireless power receiver using the separate coils.

Figure 13:
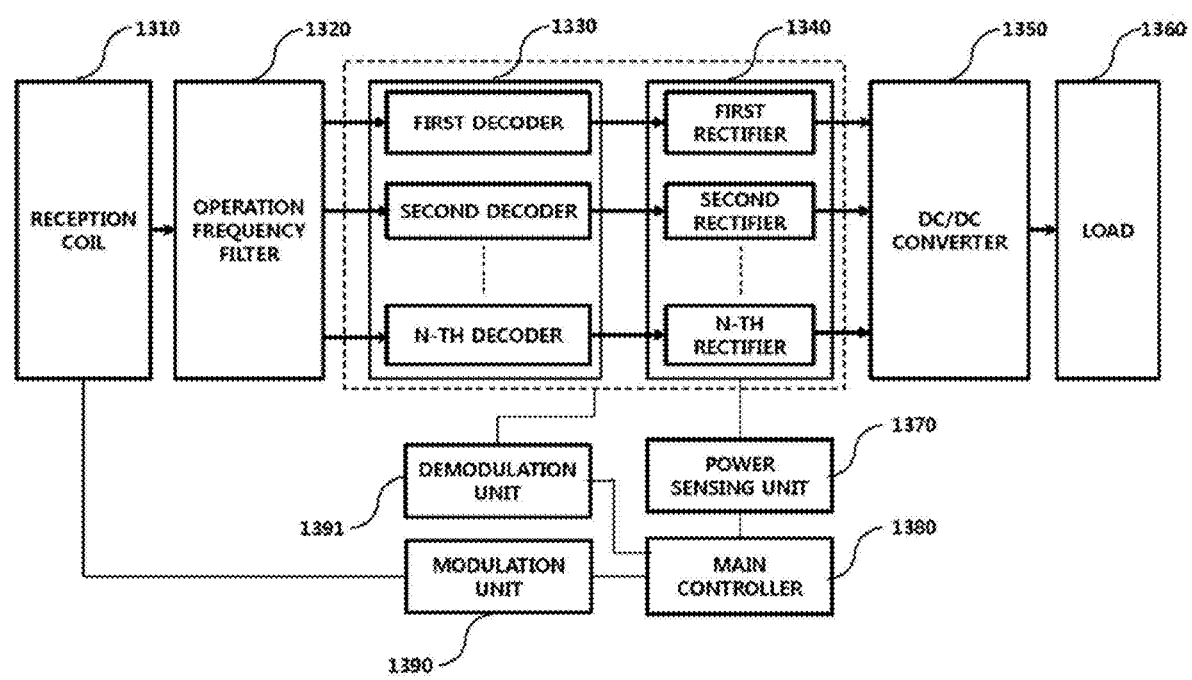
FIG. 13 is a block diagram illustrating the structure of a wireless power receiver operatively connected with the wireless power transmitter according to FIG. 12.

FIG. 13 is a block diagram illustrating the structure of a wireless power receiver operatively connected with the wireless power transmitter according to FIG. 12.

Referring to FIG. 13, a wireless power receiver 1300 may include a reception coil 1310, an operation frequency filter 1320, a decoding unit 1330, a rectification unit 1340, a DC/DC converter 1350, a load 1360, a power sensing unit 1370, a main controller 1380, a modulation unit 1390, and a demodulation unit 1391.

The AC power signal received through the reception coil 1310 may be converted into baseband after an operation frequency component is removed therefrom through the operation frequency filter 1320, and then transferred to the decoding unit 1330.

The decoding unit 1330 may include first to n-th decoders for decoding signals encoded with a plurality of different codes.

The signals decoded by the decoding unit 1330 may be transferred to the rectification unit 1340.

The rectification unit 1340 may convert the decoded AC power into DC power and transmit the DC power to the DC/DC converter 1350. The DC/DC converter 1350 may convert the intensity of the rectifier DC output power into an intensity required for a load 1360 and transfer the converted power to the load 1360.

The power sensing unit 1370 may measure the intensity of the DC output power of each of the first to n-th rectifiers included in the rectification unit 1340 and provide the same to the main controller 1380.

For example, the main control section 1380 may identify a rectifier having the measured intensity of the rectifier DC output power greater than or equal to a predetermined reference value, and control the modulation unit 1390 to transmit a signal strength indicator using a code corresponding to the identified rectifier. Specifically, when the intensity of the rectifier DC output power is greater than or equal to the predetermined reference value, the main controller 1380 may determine that a detection signal has been received. Upon receiving the detection signal, the main controller may control the modulation unit 1390 to transmit a signal strength indicator corresponding to the detection signal using the code used for transmission of the detection signal.

In another example, the demodulation unit 1391 may demodulate the outputs of the respective decoders of the decoding unit 1330 to identify whether or not a detection signal is received, and may provide the main controller 1380 with information about the code used to encode the identified detection signal. At this time, the main controller 1380 may control the signal strength indicator to be transmitted through the modulation unit 790 using the same code as the code used for transmission of the identified detection signal.

Figure 14:
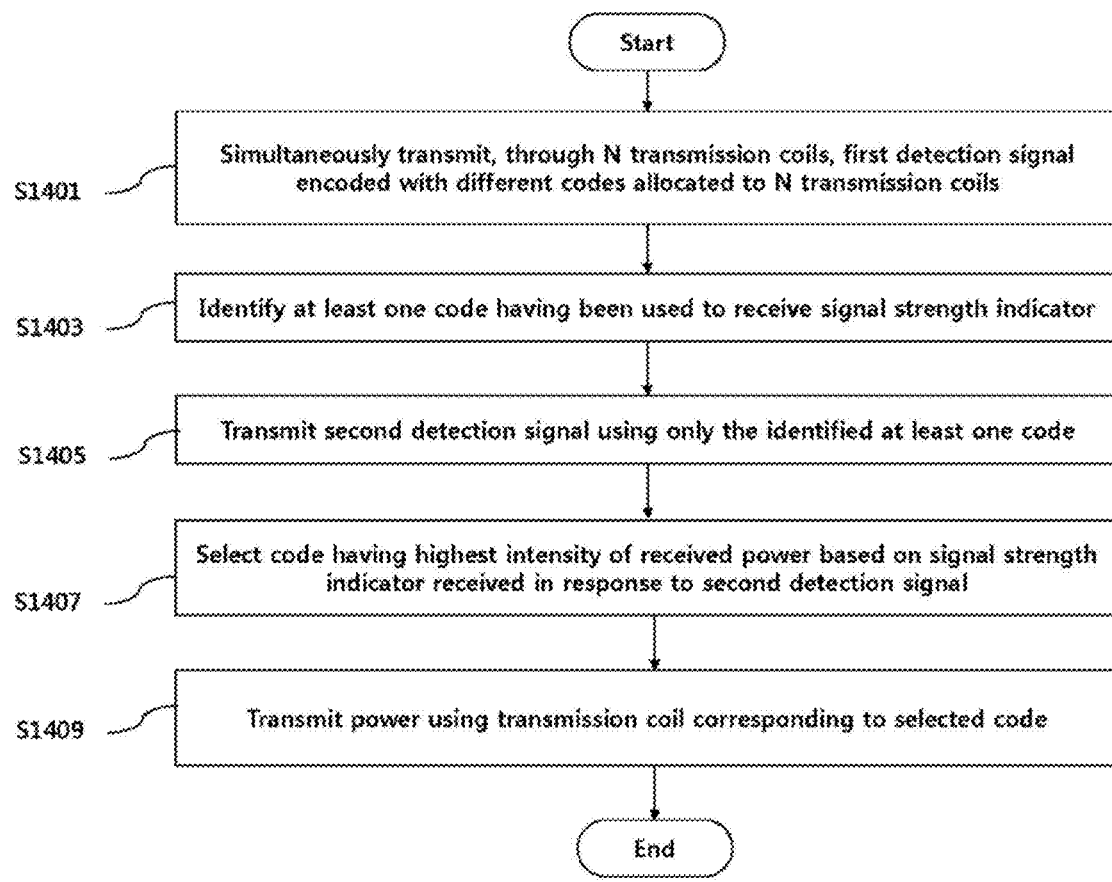
FIG. 14 is a flowchart illustrating a multi-coil wireless charging method in a multi-coil wireless power transmitter capable of transmitting detection signals encrypted using different codes for respective transmission coils according to an embodiment of the present disclosure.

FIG. 14 is a flowchart illustrating a multi-coil wireless charging method in a multi-coil wireless power transmitter capable of transmitting detection signals encrypted using different codes for respective transmission coils according to an embodiment of the present disclosure.

Referring to FIG. 14, the wireless power transmitter may simultaneously transmit, through N transmission coils, first detection signals encoded with different codes allocated to each of the N transmission coils (S1401).

The wireless power transmitter may identify at least one transmission coil through which a signal strength indicator has been received and identify at least one code that has been used to encode the first detection signal transmitted through the identified at least one transmission coil (S1403).

The wireless power transmitter may transmit the encoded second detection signal using only the identified at least one code (S1405).

The wireless power transmitter may select a code having the highest receive power intensity, based on the signal strength indicator received in response to the second detection signal (S1407). That is, the wireless power transmitter may identify a transmission coil to use for power transmission to the wireless power receiver, based on the selected code.

The wireless power transmitter may encode the power signal using the selected code, and then transmit the power using a transmission coil corresponding to the selected code (S1409).

Figure 15:
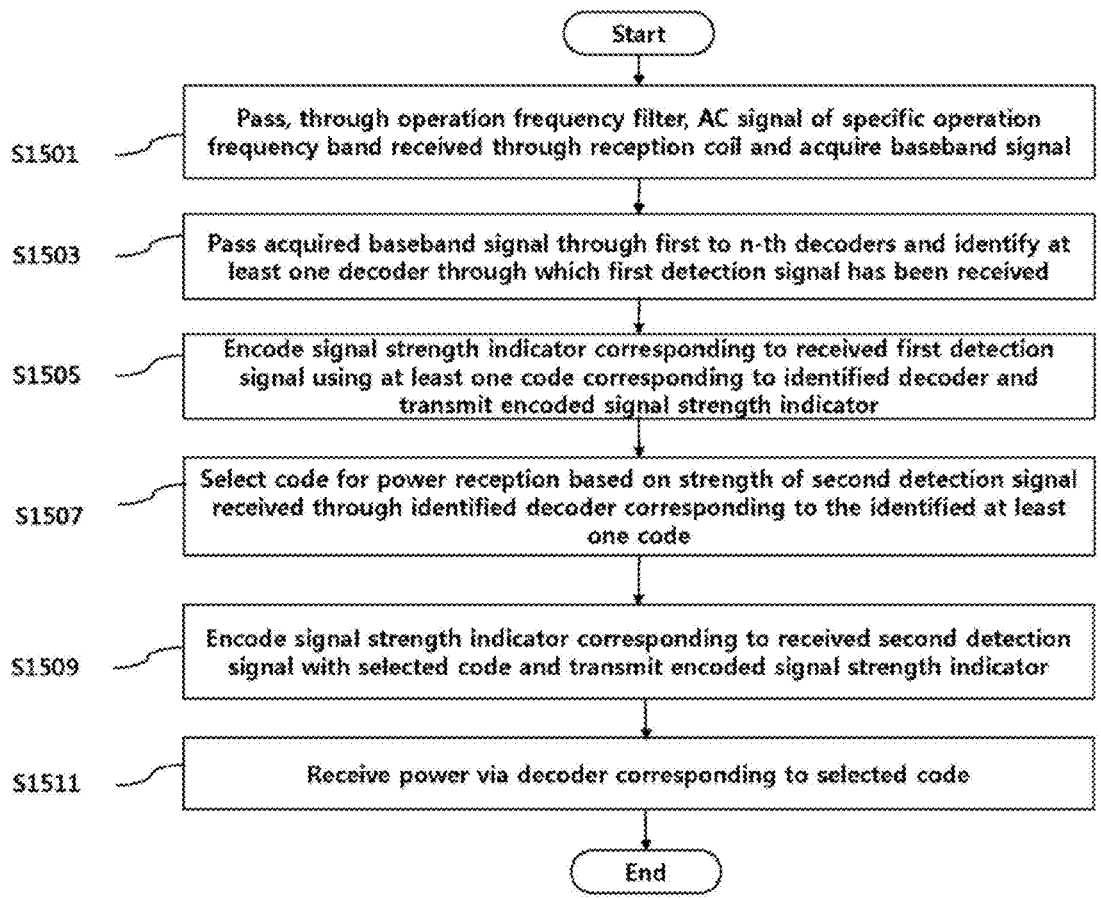
FIG. 15 is a flowchart illustrating a multi-coil wireless charging method in a wireless power receiver capable of receiving detection signals transmitted using different codes for respective transmission coils according to an embodiment of the present disclosure.

FIG. 15 is a flowchart illustrating a multi-coil wireless charging method in a wireless power receiver capable of receiving detection signals transmitted using different codes for respective transmission coils according to an embodiment of the present disclosure.

Referring to FIG. 15, a wireless power receiver may pass, through an operation frequency filter, an AC signal of a specific operation frequency band received through a reception coil and acquire a baseband signal (S1501).

The wireless power receiver may pass the acquired baseband signal to the first to n-th decoders and identify at least one decoder through which the first detection signal has been received (S1503).

The wireless power receiver may encode the signal strength indicator corresponding to the received first detection signal using at least one code corresponding to the identified decoder and transmit the encoded signal strength indicator (S1505).

The wireless power receiver may select a code for power reception based on the strength of the second detection signal received through the at least one decoder identified in operation S1503 (S1507).

The wireless power receiver may encode the signal strength indicator corresponding to the received second detection signal with the selected code and transmit the encoded signal strength indicator (S1509).

Thereafter, the wireless power receiver may receive power via the decoder corresponding to the selected code (S1511).

The method according to embodiments of the present disclosure described may be implemented as a program to be executed on a computer and stored in a computer-readable recording medium. Examples of the computer-readable recording medium include ROM, RAM, CD-ROM, magnetic tapes, floppy disks, and optical data storage devices, and also include carrier-wave type implementation (e.g., transmission over the Internet).

The computer-readable recording medium may be distributed to a computer system connected over a network, and computer-readable code may be stored and executed thereon in a distributed manner. Functional programs, code, and code segments for implementing the method described above may be easily inferred by programmers in the art to which the embodiments pertain.

It is apparent to those skilled in the art that the present disclosure may be embodied in specific forms other than those set forth herein without departing from the spirit and essential characteristics of the present disclosure.

Therefore, the above embodiments should be construed in all aspects as illustrative and not restrictive. The scope of the disclosure should be determined by the appended claims and their legal equivalents, and all changes coming within the meaning and equivalency range of the appended claims are intended to be embraced therein.

INDUSTRIAL APPLICABILITY

The present disclosure relates to a wireless transmission technique and is applicable to a wireless power transmitter on which a plurality of transmission coils is mounted.

The invention claimed is:

1. A wireless power transmitter for wirelessly transmitting power to a wireless power receiver, the wireless power transmitter comprising:
a power transmission unit comprising at least two transmission coils;
a controller configured to control a first detection signal for detecting presence of the wireless power receiver so as to be transmitted simultaneously using different frequencies pre-allocated to each of the transmission coils; and
a modulation/demodulation unit configured to transmit, when a first signal strength indicator corresponding to the first detection signal is received from the wireless power receiver, the received first signal strength indicator and a predetermined transmission coil identifier for identifying a transmission coil through which the first signal strength indicator has been received to the controller, wherein the controller controls a second detection signal so as to be transmitted through the transmission coil through which the first signal strength indicator has been received.

2. The wireless power transmitter according to claim 1, wherein the controller controls the power so as to be transmitted to the wireless power receiver using a frequency corresponding to a transmission coil through which a second signal strength indicator corresponding to the second detection signal has been received.

3. The wireless power transmitter according to claim 2, wherein, when the second signal strength indicator has been received through a plurality of transmission coils, the controller selects a frequency to be used for power transmission to the wireless power receiver, based on the second signal strength indicator.

4. The wireless power transmitter according to claim 3, wherein the second signal strength indicator is intensity information about output power of a rectifier mounted on the wireless power receiver.

5. The wireless power transmitter according to claim 1, further comprising:
a power conversion unit configured to convert power applied from a power source and transmit the converted power to the power transmission unit,
wherein the power conversion unit comprises at least one of:
a DC/DC converter configured to convert DC power applied from the power source into DC power of a predetermined intensity;
a power sensor configured to measure the intensity of the converted DC power obtained by the DC/DC converter; or
an amplifier configured to amplify the converted DC power.

6. The wireless power transmitter according to claim 5, further comprising:
a frequency generator configured to generate a predetermined frequency signal to insert an AC component into the converted DC power.

7. The wireless power transmitter according to claim 5, further comprising:
a switch configured to control the power converted by the power conversion unit so as to be transmitted through one of the at least two transmission coils.

8. The wireless power transmitter according to claim 7, further comprising:
a detection signal transmission timer configured to control a time to transmit the detection signals through the transmission coils,
wherein, when the transmission time of the detection signals arrives, the controller controls the switch to transmit the first detection signal or second detection signal.

9. The wireless power transmitter according to claim 1, wherein the first detection signal and second detection signal are digital ping signals defined in a WPC standard or a PMA standard.

10. A method for transmitting wireless power to a wireless power receiver by a wireless power transmitter having a plurality of transmission coils, the method comprising:

simultaneously transmitting a first detection signal for detecting presence of the wireless power receiver using differently assigned frequencies for each of the transmission coils;
identifying at least one frequency corresponding to a transmission coil through which a first signal strength indicator corresponding to the first detection signal has been received;
transmitting a second detection signal using the identified at least one frequency; and
determining a frequency to be used for power transmission based on a second signal strength indicator received corresponding to the second detection signal.

11. The method according to claim 10, wherein the power is controlled to be transmitted to the wireless power receiver using a frequency corresponding to a transmission coil through which the second signal strength indicator corresponding to the second detection signal has been received.

12. The method according to claim 11, wherein, when the second signal strength indicator has been received through a plurality of transmission coils, the controller selects a frequency to be used for power transmission to the wireless power receiver, based on the second signal strength indicator.

13. The method according to claim 12, wherein the second signal strength indicator is intensity information about output power of a rectifier mounted on the wireless power receiver.

14. The method according to claim 10, further comprising:
converting DC power applied from a power source into DC power of a predetermined intensity through a provided DC/DC converter and generating AC power by mixing the determined frequency with the converted DC power.

15. The method according to claim 14, wherein the generated AC power is transmitted wirelessly through a transmission coil corresponding to the determined frequency.

16. The method according to claim 10, wherein the first and second sensing signals are AC power signals transmitted discontinuously with a predetermined periodicity.

17. The method according to claim 16, wherein the first detection signal and the second detection signal are digital ping signals defined in a WPC standard or a PMA standard.

18. A wireless power receiver for wirelessly receiving power from a wireless power transmitter, the wireless power receiver comprising: a reception coil; a frequency filter configured to filter first to n-th frequencies for an AC signal received through the reception coil; and a main controller configured to identify at least one frequency at which a first detection signal is received, based on the filtered signal, wherein the main controller controls a first signal strength indicator corresponding to the first detection signal so as to be transmitted through the identified at least one frequency,
wherein, when a second detection signal is received through the at least one frequency at which the first signal strength indicator has been transmitted, the main controller controls a second signal strength indicator so as to be transmitted through a frequency corresponding to the second detection signal, and a frequency to be used for power transmission is selected by the wireless power transmitter based on the second signal strength indicator.

19. The wireless power receiver according to claim 18, wherein the main controller selects a frequency to be used for power reception based on a strength of the second detection signal received at the identified at least one frequency, and controls the second signal strength indicator corresponding to the second sensed signal so as to be transmitted using the selected frequency.

* * * * *